US012725948B2

(12) United States Patent
Shim et al.

(10) Patent No.: US 12,725,948 B2
(45) Date of Patent: Sep. 1, 2026

(54) ELECTRONIC DEVICE INCLUDING CONNECTOR

(71) Applicant: SAMSUNG ELECTRONICS CO., LTD., Suwon-si (KR)

(72) Inventors: Jongwan Shim, Suwon-si (KR); Bumhee Bae, Suwon-si (KR); Jeongnam Cheon, Suwon-si (KR); Junhwa Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 370 days.

(21) Appl. No.: 18/387,821

(22) Filed: Nov. 7, 2023

(65) Prior Publication Data

US 2024/0154329 A1 May 9, 2024

Related U.S. Application Data

(63) Continuation of application No. PCT/KR2023/017679, filed on Nov. 6, 2023.

(30) Foreign Application Priority Data

Nov. 7, 2022 (KR) ........................ 10-2022-0146789
Dec. 13, 2022 (KR) ........................ 10-2022-0173409

(51) Int. Cl.
*H01R 12/71* (2011.01)
*H01R 12/61* (2011.01)
(Continued)

(52) U.S. Cl.
CPC ......... *H01R 12/716* (2013.01); *H01R 12/613* (2013.01); *H01R 12/62* (2013.01); *H01R 12/775* (2013.01); *H01R 12/777* (2013.01)

(58) Field of Classification Search
CPC .... H01R 12/716; H01R 12/613; H01R 12/62; H01R 12/775; H01R 12/777
(Continued)

(56) References Cited

U.S. PATENT DOCUMENTS 9,072,192 B2 * 6/2015 Lin ........................ H05K 1/148
9,774,111 B2 * 9/2017 Liang ..................... H01R 12/57
(Continued)

FOREIGN PATENT DOCUMENTS

CN 205509121 U 8/2016
CN 106684593 A 5/2017
(Continued)

OTHER PUBLICATIONS

International Search Report with Written Opinion issued in International Application No. PCT/KR2023/017679; International Filing Date Nov. 6, 2023; Date of Mailing Feb. 8, 2024 (13 pages).
(Continued)

*Primary Examiner* — Gary F Paumen
(74) *Attorney, Agent, or Firm* — CANTOR COLBURN LLP

(57) ABSTRACT

An electronic device includes a housing and a connector disposed in the housing. The connector includes a case forming an outer surface of the connector and having an opening formed in at least a portion of the outer surface and a printed circuit board disposed in the case and including a first layer where a plurality of first pins are disposed, a second layer where a plurality of second pins are disposed, and a ground layer disposed between the first layer and the second layer and disposed to maintain a substantially constant distance from the first layer and the second layer. The plurality of first pins includes at least one first ground pin. The plurality of second pins includes at least one second
(Continued)

B-B' ground pin. The first ground pin and the second ground pin are configured to be connected through at least one via.

19 Claims, 18 Drawing Sheets

(51) Int. Cl.
*H01R 12/62* (2011.01)
*H01R 12/77* (2011.01)

(58) Field of Classification Search
USPC ........................................................... 439/79
See application file for complete search history.

(56) References Cited

U.S. PATENT DOCUMENTS

| | | | | | |
|---|---|---|---|---|---|
| 10,219,393 | B2 * | 2/2019 | Yasui | G06F 1/181 |
| 10,581,204 | B2 * | 3/2020 | Sawayama | H01R 13/6585 |
| 10,687,414 | B2 * | 6/2020 | Fujioka | H05K 1/115 |
| 11,038,293 | B2 * | 6/2021 | Aspnes | H05K 1/11 |
| 11,626,693 | B2 * | 4/2023 | Hu | H01R 13/6471 439/62 |
| 2013/0309906 | A1 | 11/2013 | De Geest | |
| 2014/0285280 | A1 | 9/2014 | Chuo et al. | |
| 2016/0365673 | A1 * | 12/2016 | Liang | H01R 13/6469 |
| 2017/0047689 | A1 * | 2/2017 | Yao | H01R 12/707 |
| 2017/0093099 | A1 | 3/2017 | Talalayev et al. | |
| 2017/0179658 | A1 | 6/2017 | Chuang et al. | |
| 2017/0214187 | A1 | 7/2017 | Hwangbo | |
| 2017/0271822 | A1 | 9/2017 | Zhang | |
| 2017/0331214 | A1 | 11/2017 | Orand et al. | |
| 2018/0032450 | A1 | 2/2018 | Lee et al. | |
| 2018/0261936 | A1 * | 9/2018 | Kawate | H01R 12/585 |
| 2018/0274941 | A1 | 9/2018 | Quartiroli et al. | |
| 2018/0279491 | A1 | 9/2018 | Yasui et al. | |
| 2019/0380204 | A1 | 12/2019 | Cartier, Jr. et al. | |
| 2022/0239041 | A1 | 7/2022 | Hu et al. | |

FOREIGN PATENT DOCUMENTS

| | | | | | |
|---|---|---|---|---|---|
| EP | 2779329 | A1 | | 9/2014 | |
| EP | 3582287 | A1 | * | 12/2019 | B60L 58/15 |
| KR | 20160029374 | A | * | 3/2016 | H01R 24/62 |
| KR | 20170038655 | A | | 4/2017 | |
| KR | 20170089515 | A | | 8/2017 | |
| KR | 101800146 | B1 | | 11/2017 | |
| KR | 20180014522 | A | | 2/2018 | |
| KR | 102406959 | B1 | * | 6/2022 | G06F 11/327 |

OTHER PUBLICATIONS

Extended European Search Report Issued In EP Application No. 23889082.6-1218; Mail Date Oct. 31, 2025; 15 Pages.

The Sierra Circuits Team; Handling Differential Signaling in Flex PCBs; Sierra Circuits Proto Express; Sep. 8, 2021; 17 Pages; [retrieved on Oct. 21, 2025]; URL:https://www.protoexpress.com/blog/handling-differential-signaling-flex-pcbs/.

* cited by examiner

| | PIN No. | Signal Name | remarks |
|---|---|---|---|
| 411a,411b | 1 | GND | Ground |
| 412a,412b | 2 | SSTXp | Super speed TX positive |
| 413a,413b | 3 | SSTXn | Super speed TX negative |
| 414a,414b | 4 | VBUS | USB cable charging power |
| 415a | 5 | CC | Identification terminal |
| 416a,416b | 6 | Dp | + line of the differential bi-directional USB signal |
| 417a,417b | 7 | Dn | - line of the differential bi-directional USB signal |
| 418a,418b | 8 | SBU | Side Band Use : additional purpose pin (e.g., Audio signal, display signal, etc.) |
| 419a,419b | 9 | VBUS | USB cable charging power |
| 420a,420b | 10 | SSRXn | Super speed RX negative |
| 421a,421b | 11 | SSRXp | Super speed TX positive |
| 422a,422b | 12 | GND | Ground |

FIG. 6C

ELECTRONIC DEVICE INCLUDING CONNECTOR

CROSS-REFERENCE TO RELATED APPLICATIONS

This application is a continuation application of International Application No. PCT/KR2023/017679, filed on Nov. 6, 2023, which claims priority to Korean Patent Application No. 10-2022-0146789, filed on Nov. 7, 2022, in the Korean Intellectual Property Office, and which claims priority to Korean Patent Application No. 10-2022-0173409, filed on Dec. 13, 2022, in the Korean Intellectual Property Office, the disclosures of which are incorporated by reference herein in their entireties.

TECHNICAL FIELD

An embodiment of the present invention relates to an electronic device including a connector.

BACKGROUND ART

Advancing information communication technologies and semiconductor technologies accelerate the spread and use of various electronic devices. In particular, recent electronic devices are being developed to carry out communication while being carried.

As the technology of electronic devices advances, data communication services are vigorously provided through wired connections between electronic devices and computers or external devices. A cable may electrically be connected with a charger for electronic devices. More specifically, the connector of the electronic device may be defined as a universal serial bus (USB) type-C connector. The connector may be used for data input and output or charging a wireless terminal. The connector may include a socket provided in the electronic device and a plug connector for connection with a cable.

DISCLOSURE OF INVENTION

An electronic device according to an embodiment of the disclosure may include a housing and a connector disposed in the housing. The connector may include a case and a printed circuit board disposed in the case, exposed via an opening of the case and including a first layer where a plurality of first pins are disposed, a second layer where a plurality of second pins are disposed, and a ground layer disposed between the first layer and the second layer and disposed to maintain a substantially constant distance from the first layer and the second layer. The plurality of first pins may include at least one first ground pin. The plurality of second pins may include at least one second ground pin. The first ground pin and the second ground pin may be configured to be connected through at least one via.

An electronic device according to an embodiment of the disclosure may include a housing and a connector disposed in the housing. The connector may include a case forming an outer surface of the connector and having an opening formed in at least a portion of the outer surface and a printed circuit board disposed in the case and including a first layer where a plurality of first pins are disposed, a second layer where a plurality of second pins are disposed, and a ground layer disposed between the first layer and the second layer and disposed to maintain a substantially constant distance from the first layer and the second layer. The plurality of first pins may include at least one first ground pin. The plurality of second pins may include at least one second ground pin. The ground layer may include a mesh ground in which at least some of ground electrodes constituting the ground layer are disposed in a mesh form.

BRIEF DESCRIPTION OF DRAWINGS

FIGS. 6B and 6C are views illustrating pins of a connector according to an embodiment of the disclosure;

MODE FOR THE INVENTION

Figure 1:
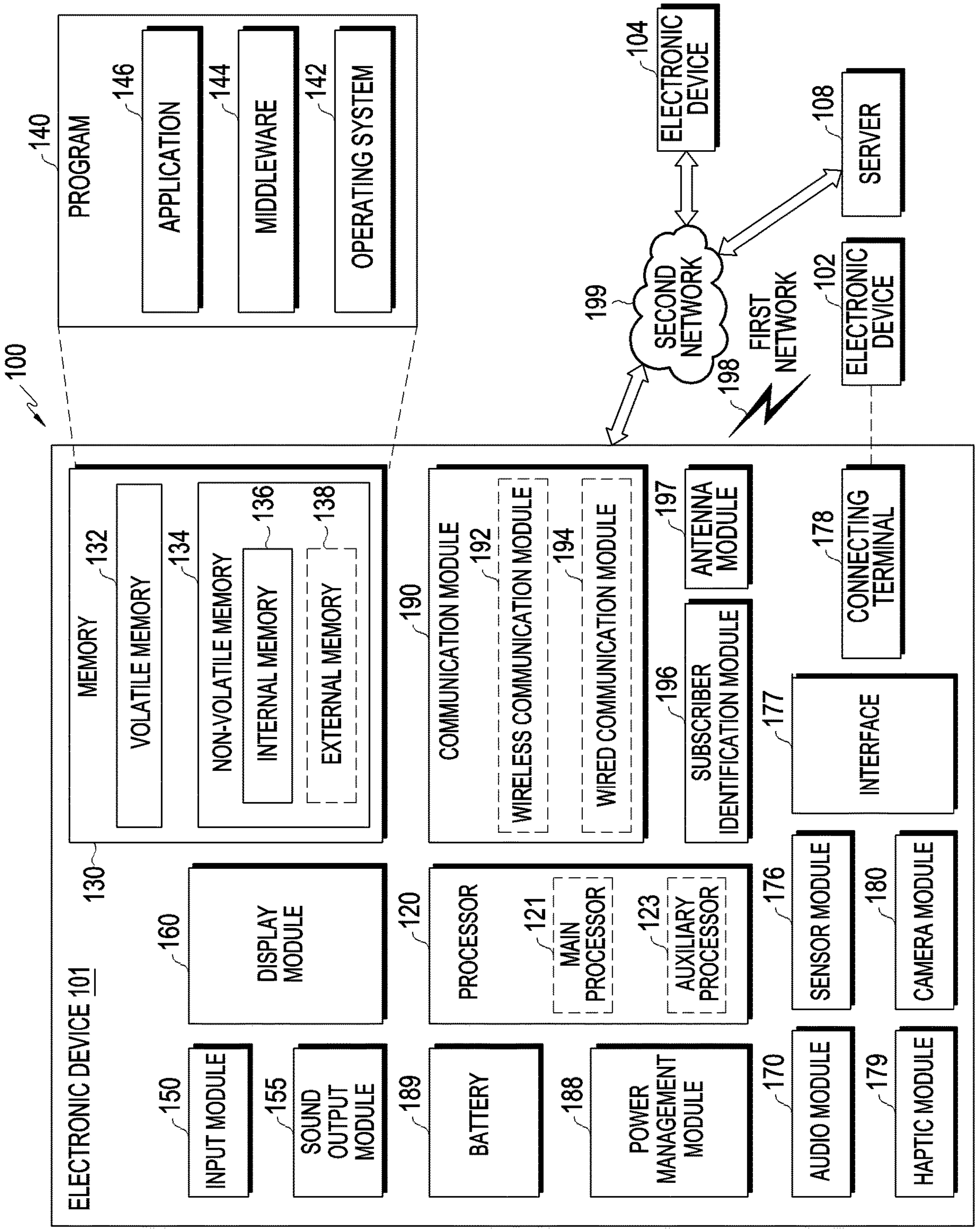
FIG. 1 is a block diagram illustrating an electronic device in a network environment according to an embodiment of the disclosure.

The electronic device according to embodiments of the disclosure may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. In an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
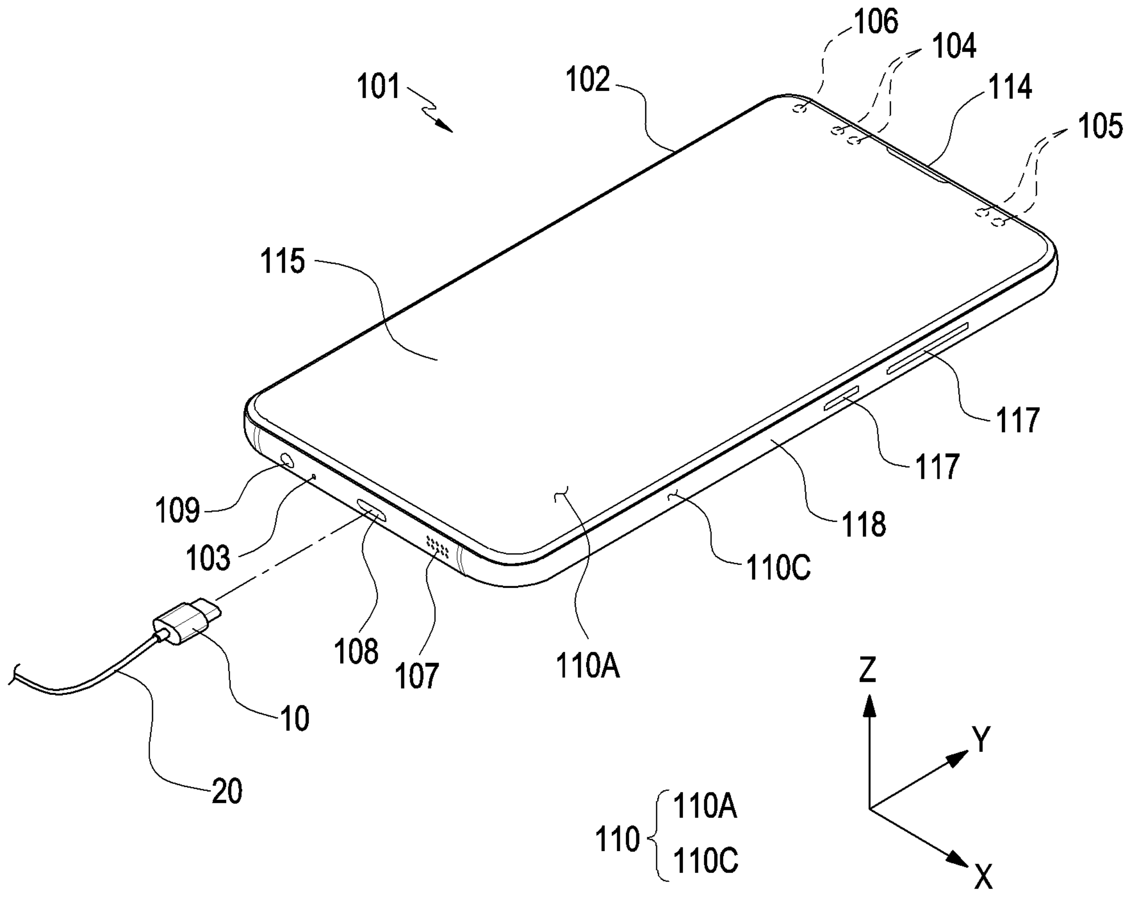
FIG. 2 is a front perspective view illustrating an electronic device according to an embodiment of the disclosure.

FIG. 2 is a front perspective view illustrating an electronic device 101 according to an embodiment of the disclosure.

Figure 3:
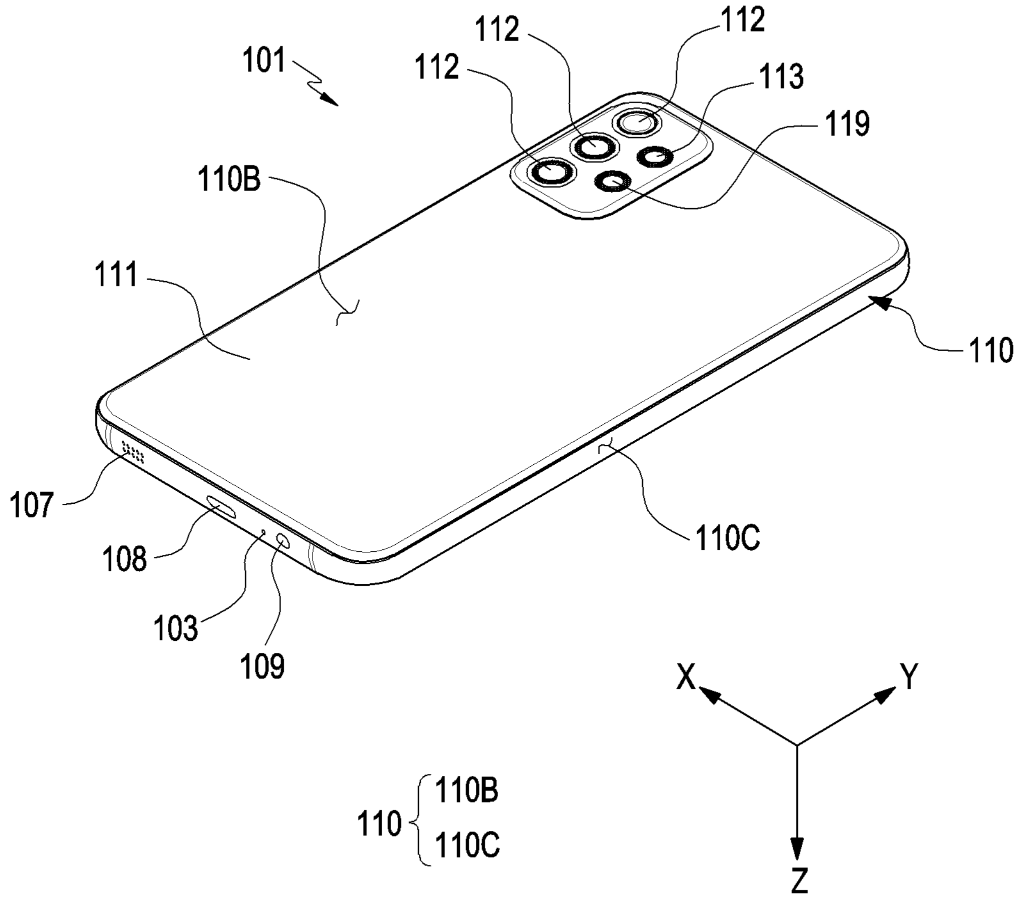
FIG. 3 is a rear perspective view illustrating the electronic device of FIG. 2 according to an embodiment of the disclosure.

FIG. 3 is a rear perspective view illustrating the electronic device 101 of FIG. 3 according to an embodiment of the disclosure.

Referring to FIGS. 2 and 3, according to an embodiment, an electronic device 101 (e.g., the electronic device 101 of FIG. 1) may include a housing 110 including a first surface (or front surface) 110A, a second surface (or rear surface) 110B, and a side surface 110C surrounding a space between the first surface 110A and the second surface 110B. According to an embodiment (not shown), the housing 110 may denote a structure forming the first surface 110A of FIG. 2, the second surface 110B of FIG. 3, and some of the side surfaces 110C.

According to an embodiment, the first surface 110A may be formed by a front plate 102 (e.g., a glass plate or polymer plate with various coat layers) at least part of which is substantially transparent. The second surface 110B may be formed by a rear plate 111 that is substantially opaque. The rear plate 111 may be formed of, e.g., laminated or colored glass, ceramic, polymer, metal (e.g., aluminum, stainless steel (STS), or magnesium), or a combination of at least two thereof. The side surface 110C may be formed by a side structure (or a "side bezel structure") 118 that couples to the front plate 102 and the rear plate 111 and includes a metal and/or polymer. In an embodiment, the rear plate 111 and the side structure 118 may be integrally formed together and include the same material (e.g., a metal, such as aluminum).

According to an embodiment, the front plate 102 may include area(s) that bend from at least a portion of an edge toward the rear plate 111 and seamlessly extend. For example, only one of the areas of the front plate 102 (or the rear plate 111), which bend to the rear plate 111 (or front plate 102) and extend may be included in one edge of the first surface 110A. According to an embodiment, the front plate 102 or rear plate 111 may be substantially flat and, in this case, may not include an area bending and extending. When an area bending and extending is included in the front plate 102 or rear plate 111, the thickness of the electronic device 101 at the portion including the area bending and extending may be smaller than the thickness of the rest.

According to an embodiment, the electronic device 101 may include at least one of a display 115, an audio module (e.g., the microphone hole 103, the external speaker hole 107, and the phone receiver hole 114), a sensor module (e.g., the first sensor module 104, the second sensor module (not illustrated), or the third sensor module 119), a camera module (e.g., the first camera device 105, the second camera device 112, or the flash 113), a key input device 117, a light emitting device 106, and a connector hole (e.g., the first connector hole 108 or the second connector hole 109). In an embodiment, the electronic device 101 may exclude at least one (e.g., the key input device 117 or the light emitting device 106) of the components or may add other components.

The display 115 may output a screen or be visually exposed through a significant portion of the first surface 110A (e.g., the front plate 102), for example. In an embodiment, at least a portion of the display 115 may be visually exposed through the front plate 102 forming the first surface 110A, or through a portion of the side surface 110C. In an embodiment, the edge of the display 115 may be formed to be substantially the same in shape as an adjacent outer edge of the front plate 102. In an embodiment (not shown), the interval between the outer edge of the display 115 and the outer edge of the front plate 102 may remain substantially even to give a larger area of exposure for the display 115.

According to an embodiment, a recess or an opening may be formed in a portion of the screen display area of the display 115, and there may be included at least one of an audio module (e.g., the phone receiver hole 114), a sensor module (e.g., the first sensor module 104), a camera module (e.g., the first camera device 105), and a light emitting device 106 that are aligned with the recess or the opening. In an embodiment (not shown), at least one of the audio module (e.g., the phone receiver hole 114), sensor module (e.g., the first sensor module 104), camera module (e.g., the first camera device 105), fingerprint sensor (not shown), and light emitting device 106 may be included on the rear surface of the screen display area of the display 115. In an embodiment (not shown), the display 115 may be disposed to be coupled with, or adjacent, a touch detecting circuit, a pressure sensor capable of measuring the strength (pressure) of touches, and/or a digitizer for detecting a magnetic field-type stylus pen.

According to an embodiment, the audio modules 103, 107, and 114 may include a microphone hole 103 and speaker holes (e.g., the external speaker hole 107 and the phone receiver hole 114). A microphone for acquiring external sounds may be disposed in the microphone hole 103. In an embodiment, a plurality of microphones may be disposed to detect the direction of the sound. The speaker holes may include an external speaker hole 107 and a phone receiver hole 114. According to an embodiment, the speaker holes (e.g., the external speaker hole 107 and the phone receiver hole 114) and the microphone hole 103 may be implemented as a single hole, or speakers may be included without the speaker holes (e.g., the external speaker hole 107 and the phone receiver hole 114) (e.g., piezo speakers).

According to an embodiment, the sensor module may generate an electrical signal or data value corresponding to an internal operating state or external environmental state of the electronic device 101. The sensor modules may include a first sensor module 104 (e.g., a proximity sensor) and/or a second sensor module (not shown) (e.g., a fingerprint sensor) disposed on the first surface 110A of the housing 110 and/or a third sensor module 119 disposed on the second surface 110B of the housing 110. The second sensor module (not shown) (e.g., a fingerprint sensor) may be disposed on the second surface 110B or side surface 110C as well as the first surface 110A (e.g., the display 115) of the housing 110. The electronic device 101 may further include, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

According to an embodiment, the camera modules may include a first camera device 105 disposed on the first surface 110A of the electronic device 101, and a second camera device 112 and/or a flash 113 disposed on the second surface 110B. The camera devices (e.g., the first camera device 105 and the second camera device 112) may include one or more lenses, an image sensor, and/or an image signal processor. The flash 113 may include, e.g., a light emitting diode (LED) or a xenon lamp. In an embodiment, one or more lenses (an infrared (IR) camera, a wide-angle lens, and a telescopic lens) and image sensors may be disposed on one surface of the electronic device 101. In an embodiment, flash 113 may emit infrared light. The infrared light emitted by the flash 113 and reflected by the subject may be received through the third sensor module 119. The electronic device 101 or the processor (e.g., the processor 120 of FIG. 1) of the electronic device 101 may detect depth information about the subject based on the time point when the infrared light is received from the third sensor module 119.

According to an embodiment, the key input device 117 may be disposed on the side surface 110C of the housing 110. In an embodiment, the electronic device 101 may exclude all or some of the above-mentioned key input devices 117 and the excluded key input devices 117 may be implemented in other forms, e.g., as soft keys, on the display 115. In an embodiment, the key input device may include the sensor module disposed on the second surface 110B of the housing 110.

According to an embodiment, the light emitting device 106 may be disposed on the first surface 110A of the housing 110, for example. The light emitting device 106 may provide, e.g., information about the state of the electronic device 101 in the form of light. In an embodiment, the light emitting device 106 may provide a light source that interacts with, e.g., the camera module (e.g., the first camera device 105). The light emitting device 106 may include, e.g., a light emitting diode (LED), an infrared (IR) LED, or a xenon lamp.

The electronic device 101 according to various embodiments of the present invention may be a smartphone, a wearable device, a TV, or a tablet PC including a USB type-C connector.

According to an embodiment, the connector holes (e.g., the first connector hole 108 or the second connector hole 109) may include, e.g., a first connector hole 108 (e.g., the connecting terminal 178 of FIG. 1) for receiving a connector (e.g., a USB connector) for transmitting/receiving power and/or data to/from an external electronic device (e.g., the electronic device 1002 of FIG. 1) and/or a second connector hole 109 (e.g., an earphone jack) for receiving a connector for transmitting/receiving audio signals to/from the external electronic device.

According to an embodiment, a header-type external connector 10 may be coupled to the first connector hole 108 in a forward or backward direction. According to an embodiment, the external connector 10 may be connected to the cable 20, and as the external connector 10 is coupled to the first connector hole 108, the electronic device 101 and the cable 20 (e.g., the electronic device 102 of FIG. 1) may be connected. According to an embodiment, the cable 20 may be coupled with or include various external devices that may be connected to the electronic device 101. For example, the cable 20 may include an audio device, a computer, a charger, a memory, an electric fan, or an antenna (e.g., a digital multi-media broadcast antenna or frequency modulation (FM) antenna).

Figure 4A:
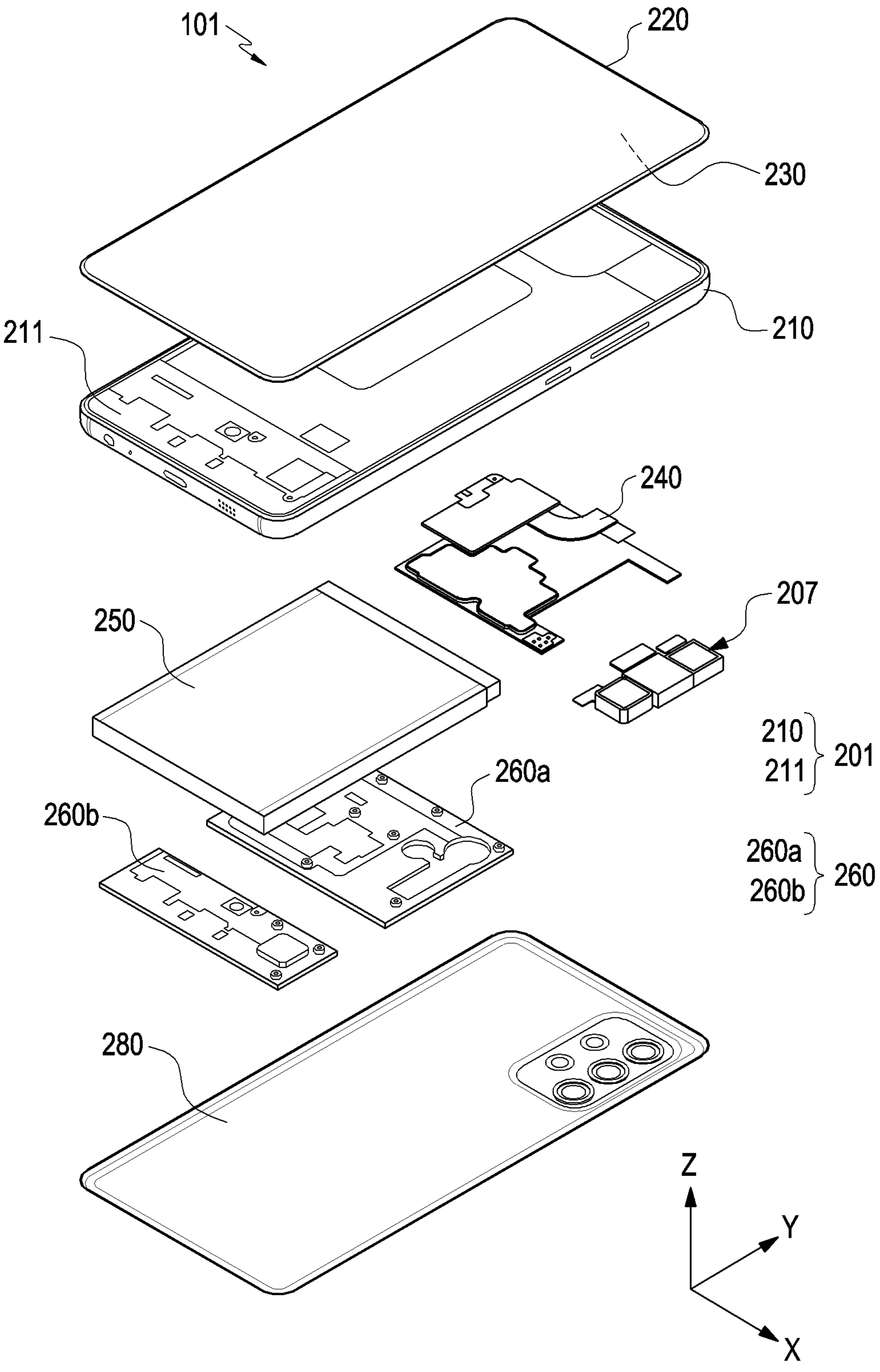
FIG. 4A is a front exploded perspective view illustrating the electronic device of FIG. 2 according to an embodiment of the disclosure.

FIG. 4A is a front exploded perspective view illustrating the electronic device 101 of FIG. 2 according to an embodiment of the disclosure.

Figure 4B:
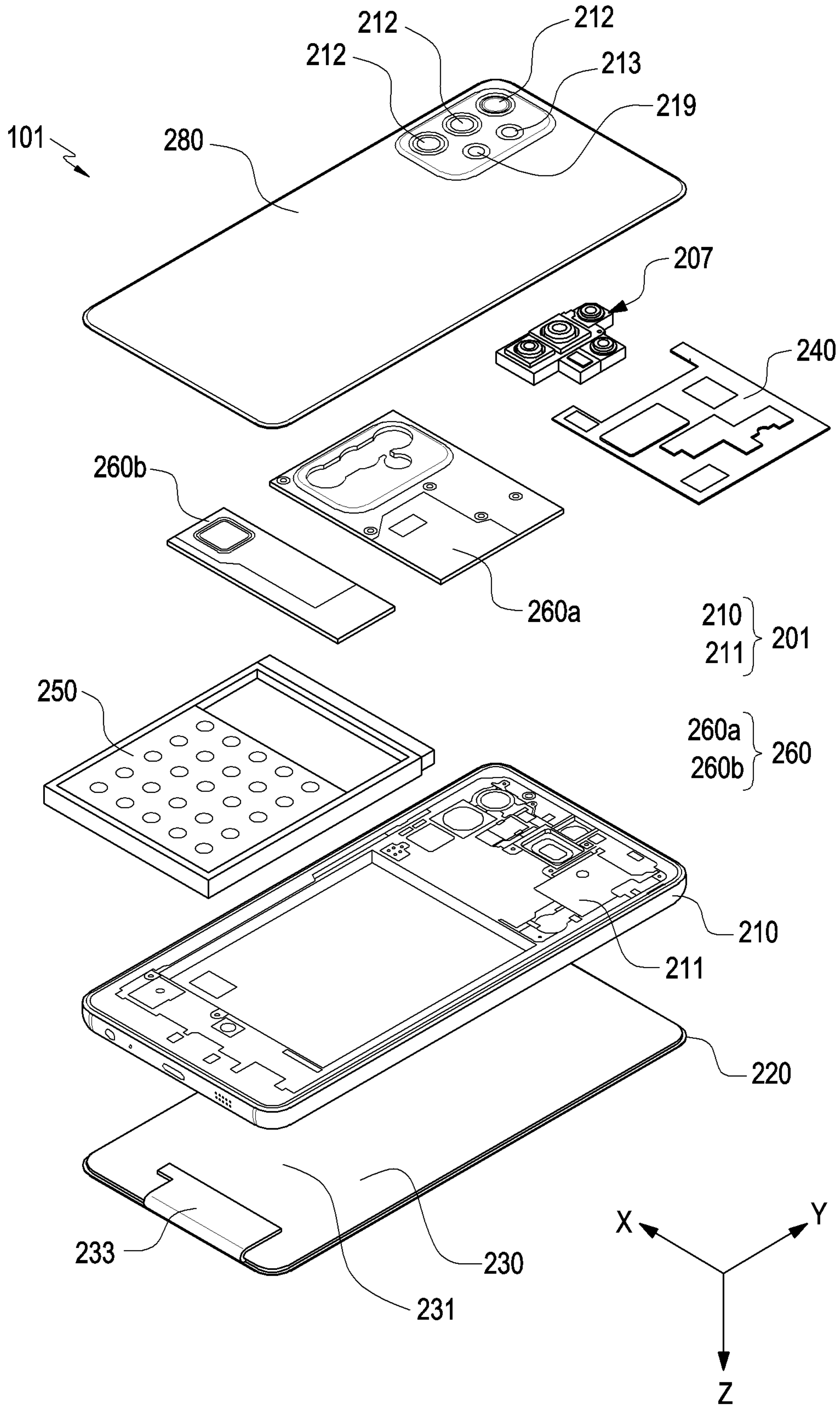
FIG. 4B is a rear exploded perspective view illustrating the electronic device of FIG. 2 according to an embodiment of the disclosure.

FIG. 4B is a rear exploded perspective view illustrating the electronic device 101 of FIG. 2 according to an embodiment of the disclosure.

Referring to FIGS. 4A and 4B, an electronic device 101 (e.g., the electronic device 101 of FIG. 1, 2, or 3) may include a side structure 210, a first supporting member 211 (e.g., a bracket), a front plate 220 (e.g., the front plate 102 of FIG. 2), a display 230 (e.g., the display 115 of FIGS. 2 and 3), a printed circuit board (or a board assembly) 240, a battery 250, a second supporting member 260 (e.g., a rear case), an antenna, a camera assembly 207, and a rear plate 280 (e.g., the rear plate 111 of FIG. 3).

According to an embodiment, the electronic device 101 may exclude at least one (e.g., the first supporting member 211 or the second supporting member 260) of the components or may add other components. At least one of the components of the electronic device 101 may be the same or similar to at least one of the components of the electronic device 101 of FIG. 2 or 3 and no duplicate description is made below.

According to an embodiment, the first supporting member 211 may be disposed inside the electronic device 101 to be connected with the side structure 210 or integrated with the side structure 210. The first supporting member 211 may be formed of, e.g., a metallic material and/or non-metallic material (e.g., polymer). When at least partially formed of a metallic material, a portion of the side structure 210 or the first supporting member 211 may function as an antenna. The display 230 may be joined onto one surface of the first supporting member 211, and the printed circuit board 240 may be joined onto the opposite surface of the first supporting member 232. A processor (e.g., the processor 120 of FIG. 1), a memory (e.g., the memory 130 of FIG. 1), and/or an interface (e.g., the interface 177 of FIG. 1) may be mounted on the printed circuit board 240. The processor may include one or more of, e.g., a central processing unit, an application processor, a graphic processing device, an image signal processing, a sensor hub processor, or a communication processor.

According to an embodiment, the first supporting member 211 and the side structure 210 may be collectively referred to as a front case or a housing 201. According to an embodiment, the housing 201 may be generally understood as a structure for receiving, protecting, or disposing the printed circuit board 240 or the battery 250. In an embodiment, the housing 201 may be understood as including a structure that the user may visually or tactfully recognize from the exterior of the electronic device 101, e.g., the side structure 210, the front plate 220, and/or the rear plate 280. In an embodiment, the "front or rear surface of the housing 201" may mean the first surface 110A of FIG. 2 or the second surface 110B of FIG. 3. In an embodiment, the first supporting member 211 may be disposed between the front plate 220 (e.g., the first surface 110A of FIG. 2) and the rear plate 280 (e.g., the second surface 110B of FIG. 3) and may function as a structure for placing an electrical/electronic component, such as the printed circuit board 240 or the camera assembly 207.

According to an embodiment, the display 230 may include a display panel 231 and a flexible printed circuit board 233 extending from the display panel 231. It may be understood that the flexible printed circuit board 233 is, e.g., electrically connected to the display panel 231 while at least partially disposed on the rear surface of the display panel 231. In an embodiment, reference number "231" may be understood as a protective sheet disposed on the rear surface of the display panel. For example, the protective sheet may be understood as a portion of the display panel 231 unless otherwise designated in the detailed description below. In an embodiment, the protective sheet may function as a cushioning structure that absorbs external force (e.g., a low-density elastic material, such as a sponge) or an electromagnetic shielding structure (e.g., a copper sheet (CU sheet)). According to an embodiment, the display 230 may be disposed on the inner surface of the front plate 220 and, by including a light emitting layer, output a screen through at least a portion of the front plate 220 or the first surface 110A of FIG. 2. As mentioned above, the display 230 may output substantially the entire area of the front plate 220 or the first surface 110A of FIG. 2.

According to an embodiment, the memory may include, e.g., a volatile or non-volatile memory.

According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the second supporting member 260 may include, e.g., an upper supporting member 260*a* and a lower supporting member 260*b*. In an embodiment, the upper supporting member 260*a*, together with a portion of the first supporting member 211, may be disposed to surround the printed circuit board 240. A circuit device (e.g., a processor, a communication module, or a memory) implemented in the form of an integrated circuit chip or various electrical/electronic components may be disposed on the printed circuit board 240. According to an embodiment, the printed circuit board 240 may receive an electromagnetic shielding environment from the upper supporting member 260*a*. In an embodiment, the lower supporting member 260*b* may be utilized as a structure in which electrical/electronic components, such as a speaker module and an interface (e.g., a USB connector, an SD card/MMC connector, or an audio connector) may be disposed. In an embodiment, electrical/electronic components, such as a speaker module and an interface (e.g., a USB connector, an SD card/MMC connector, or an audio connector) may be disposed on an additional printed circuit board (not shown). In this case, the lower supporting member 260*b*, together with the other part of the first supporting member 211, may be disposed to surround the additional printed circuit board. A speaker module or interface disposed on an additional printed circuit board (not shown) or lower supporting member 260*b* may be disposed corresponding to the connector hole (e.g., the first connector hole 108 or the second connector hole 109) or the audio module (e.g., the microphone hole 103 or the speaker hole (e.g., the external speaker hole 107 or the phone receiver hole 114)) of FIG. 2.

According to an embodiment, it may be disposed corresponding to the audio module 207 or the connector hole 108 or 109.

According to an embodiment, the battery 250 (e.g., the battery 189 of FIG. 1) may be a device for supplying power to at least one component of the electronic device 101. The battery 250 may include, e.g., a primary cell which is not rechargeable, a secondary cell which is rechargeable, and/or a fuel cell. At least a portion of the battery 250 may be disposed on substantially the same plane as the printed circuit board 240. The battery 250 may be integrally or detachably disposed inside the electronic device 101.

Although not shown, the antenna may include a conductor pattern implemented on the surface of the second supporting member 260 through, e.g., laser direct structuring. In an embodiment, the antenna may include a printed circuit pattern formed on the surface of the thin film. The thin film-type antenna may be disposed between the rear plate 280 and the battery 250. The antenna may include, e.g., a near-field communication (NFC) antenna, a wireless charging antenna, and/or a magnetic secure transmission (MST) antenna. The antenna may perform short-range communication with, e.g., an external device or may wirelessly transmit or receive power necessary for charging. In an embodiment of the present invention, another antenna structure may be formed by a portion or combination of the side structure 210 and/or the first supporting member 211.

According to an embodiment, the camera assembly 207 may include at least one camera module. Inside the electronic device 101, the camera assembly 207 may receive at least a portion of the light incident through the optical hole or the camera windows 212, 213, and 219. In an embodiment, the camera assembly 207 may be disposed on the first supporting member 211 in a position adjacent to the printed circuit board 240. In an embodiment, the camera module(s) of the camera assembly 207 may be generally aligned with either one of the camera windows 212, 213, and 219 and may be a least partially surrounded by the second supporting member 260 (e.g., the upper supporting member 260*a*).

Figure 5A:
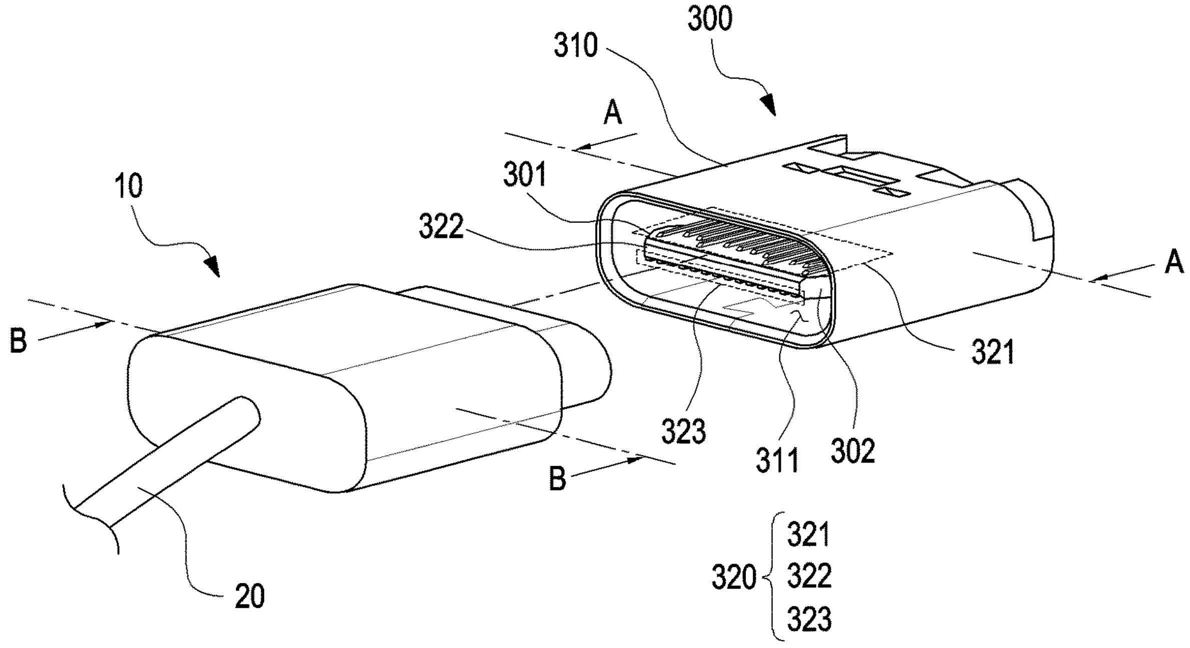
FIG. 5A is a perspective view illustrating a connector of an electronic device and an external connector according to an embodiment of the disclosure.

FIG. 5A is a perspective view illustrating a connector 300 of an electronic device and an external connector 10 according to an embodiment of the disclosure.

Figure 5B:
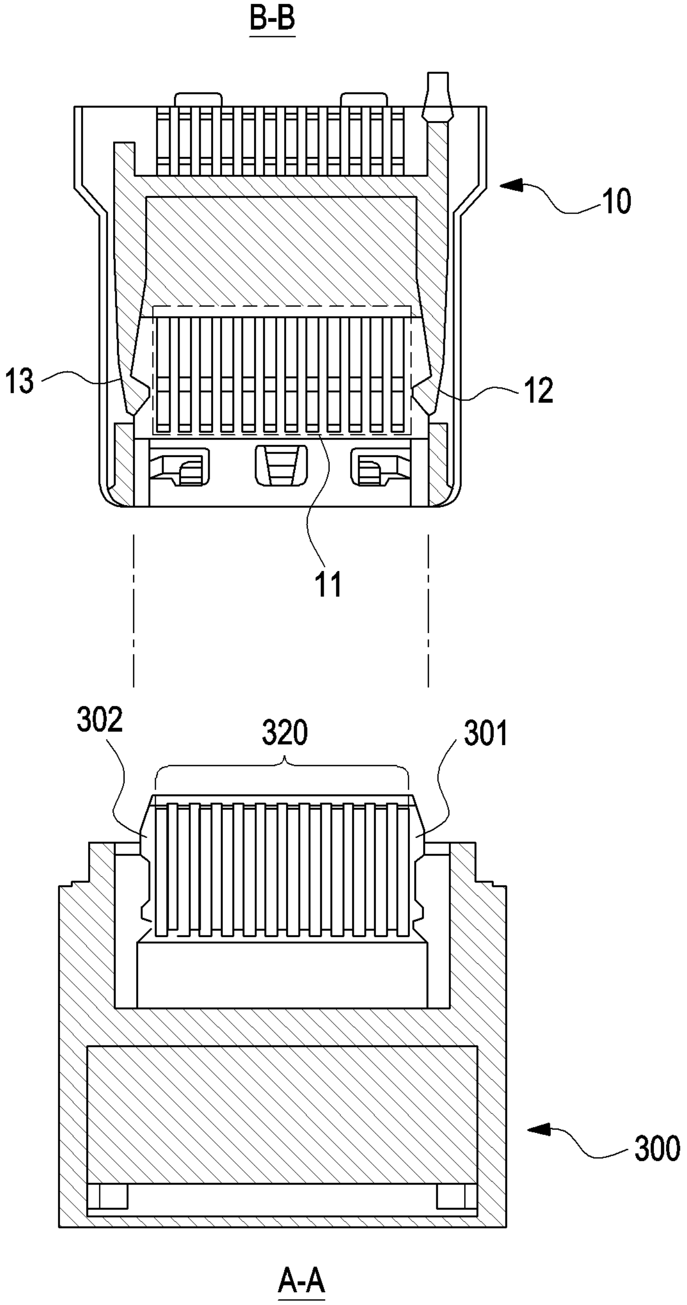
FIG. 5B is a cross-sectional view illustrating each of a connector of an electronic device and an external connector according to an embodiment of the disclosure.

FIG. 5B is a cross-sectional view illustrating each of a connector 300 of an electronic device and an external connector 10 according to an embodiment of the disclosure.

The structures of FIGS. 5A and 5B may be selectively combinable with the structures of FIGS. 2 to 4.

According to an embodiment, an electronic device (e.g., the electronic device 101 of FIG. 1) may include a housing (e.g., the housing 110 of FIG. 2), a wireless communication circuit (e.g., the communication module 190 of FIG. 1) capable of receiving wireless communication data, and a connector 300 (e.g., the connecting terminal 178 of FIG. 1) disposed in the housing.

According to an embodiment, the connector 300 of the electronic device may include a case 310 and a printed circuit board 320 disposed inside the case 310.

According to an embodiment, the connector 300 may be electrically connected to an external electronic device. The electronic device 101 may be connected by a wired connection to the external electronic device (e.g., the electronic device 102 of FIG. 1) through the connector 300. The connector 300 may be used as the interface for connecting the electronic device 101 to the external electronic device (e.g., the electronic device 102 of FIG. 1) or a power source (not shown). The electronic device 101 may transmit data stored in the memory 130 of the electronic device 101 to the external electronic device (e.g., the electronic device 102 of FIG. 1) or may receive data from the external electronic device (e.g., the electronic device 102 of FIG. 1) through a wired cable connected to the connector 300 under the control of the processor (e.g., the processor 120 of FIG. 1). Further, the electronic device 101 may receive power from a power source (not shown) through a wired cable connected to the connector 300, or may charge the battery (not shown) using the power source.

According to an embodiment, the connector 300 may be in the form of a socket. For example, the connector 300 may be a socket-type connector of a universal serial bus (USB) type-C connector. According to an embodiment, the connector 300 may form an outer surface of the connector 300, and may include the case 310 in which an opening 311 (e.g., the first connector hole 108 of FIG. 2) is formed in at least a portion of the outer surface thereof to be coupled to a header-shaped external connector 10 (e.g., the external connector 10 of FIG. 2) in a forward direction or a reverse direction. According to an embodiment, the case 310 may form an outer surface of the connector 300 and may define a space therein in which an internal component of the connector 300 is mounted. The connector 300 may be formed to be mounted upwardly or downwardly with a terminal of the external electronic device (e.g., the electronic device 102 of FIG. 1). For example, the terminal of the external electronic device (e.g., the electronic device 102 of FIG. 1) may be plugged into the connector 300 in any direction. According to an embodiment, the case 310 may form a portion of the housing (e.g., the housing 110 of FIG. 2) of the electronic device 101. According to an embodiment, the case 310 may be integrally formed with the housing. According to an embodiment, the case 310 may be configured separately from the housing.

According to an embodiment, the connector 300 may include the printed circuit board 320 inside the opening 311. According to an embodiment, the printed circuit board 320 may be disposed in a central portion inside the opening 311 formed in the case 310.

According to an embodiment, the conductor constituting the printed circuit board 320 may include, e.g., copper (Cu). According to an embodiment, the conductor constituting the connector 300 may be formed of only copper having high electrical conductivity. The connector 300 according to the present invention may enhance electrical characteristics by using the printed circuit board 320 formed of only copper having higher electrical conductivity than the SUS without using a SUS structure (e.g., a mid-plate formed of the SUS).

According to an embodiment, the printed circuit board 320 may include a plurality of conductive layers (e.g., a first layer 321, a second layer 323, and a ground layer 322) and an insulating layer (e.g., the insulating layer 550 of FIG. 8) stacked between the conductive layers.

According to an embodiment, the printed circuit board 320 may include a first layer 321 on which a plurality of first pins corresponding to the forward direction are disposed and a second layer 323 on which a plurality of second pins corresponding to the reverse direction are disposed. The plurality of pins formed on the first layer 321 and the second layer 323 may be arranged such that data transmission/reception or power reception is possible no matter which direction the terminal of the external electronic device (e.g., the electronic device 102 of FIG. 1) is plugged in.

According to an embodiment, the connector 300 may further include first and second latch pins 301 and 302 that enable electrical connection and/or physical connection of the external connector 10. According to an embodiment, at least a portion of the first and second latch pins 301 and 302 may include a fastening recess to which the external connector 10 may be fastened. According to an embodiment, the first latch pin 301 may correspond to the forward direction, the second latch pin 302 may correspond to the reverse direction, and at least one of the first and second latch pins 301 and 302 may be selectively connected to wireless communication data.

According to an embodiment, the connector 300 of the electronic device 101 may be termed as a receptacle, and the external connector 10 that may be fastened to the receptacle may be termed as a plug.

According to an embodiment, referring to FIG. 5B, the external connector 10 (e.g., the external connector 10 of FIG. 2) may include the external substrate 11 including at least one pin that may be partially coupled to a plurality of pins of the printed circuit board 320 of the connector 300. For example, the external substrate 11 may include at least one pin that may be coupled with at least some of the plurality of first pins of the printed circuit board 320 of the connector 300 and the plurality of second pins of the printed circuit board 320 of the connector 300. According to an embodiment, the external connector 10 may further include a first hook 12 and a second hook 13 that enable electrical connection or physical connection with the connector 300. According to an embodiment, at least a portion of the first hook 12 and the second hook 13 may be coupled to the fastening recess of the connector 300. According to an embodiment, the first hook 12 may correspond to the forward direction, and the second hook 13 may correspond to the reverse direction. The first hook 12 may correspond to the forward direction, and at least one of the second hooks 13 may be selectively connected to the wireless communication circuit through at least one of the first and second latch pins 301 and 302.

According to an embodiment, the cable 20 including the external connector 10 may include an antenna (e.g., the antenna module 197 of FIG. 1) capable of receiving wireless communication data. According to an embodiment, the cable 20 including the external connector 10 may include an antenna capable of receiving wireless broadcast data. According to an embodiment, the cable 20 including the external connector 10 may include an antenna capable of receiving digital multimedia broadcasting (DMB) data or frequency modulation (FM) broadcast data. According to an embodiment, the connector 300 may be a USB type-C socket, and the external connector 10 may be a USB type-C header. According to an embodiment, the electronic device may further include a sensing circuit (e.g., the interface 177 of FIG. 1 or an integrated circuit (IC)) to sense the voltage supplied to at least one of one or more first signal pins and one or more second signal pins, and the at least one processor may be configured to selectively connect the at least one first signal pin or the at least one second signal pin to a corresponding one of a circuit having a specified function and the wireless communication circuit, based on the sensed voltage.

Figure 6A:
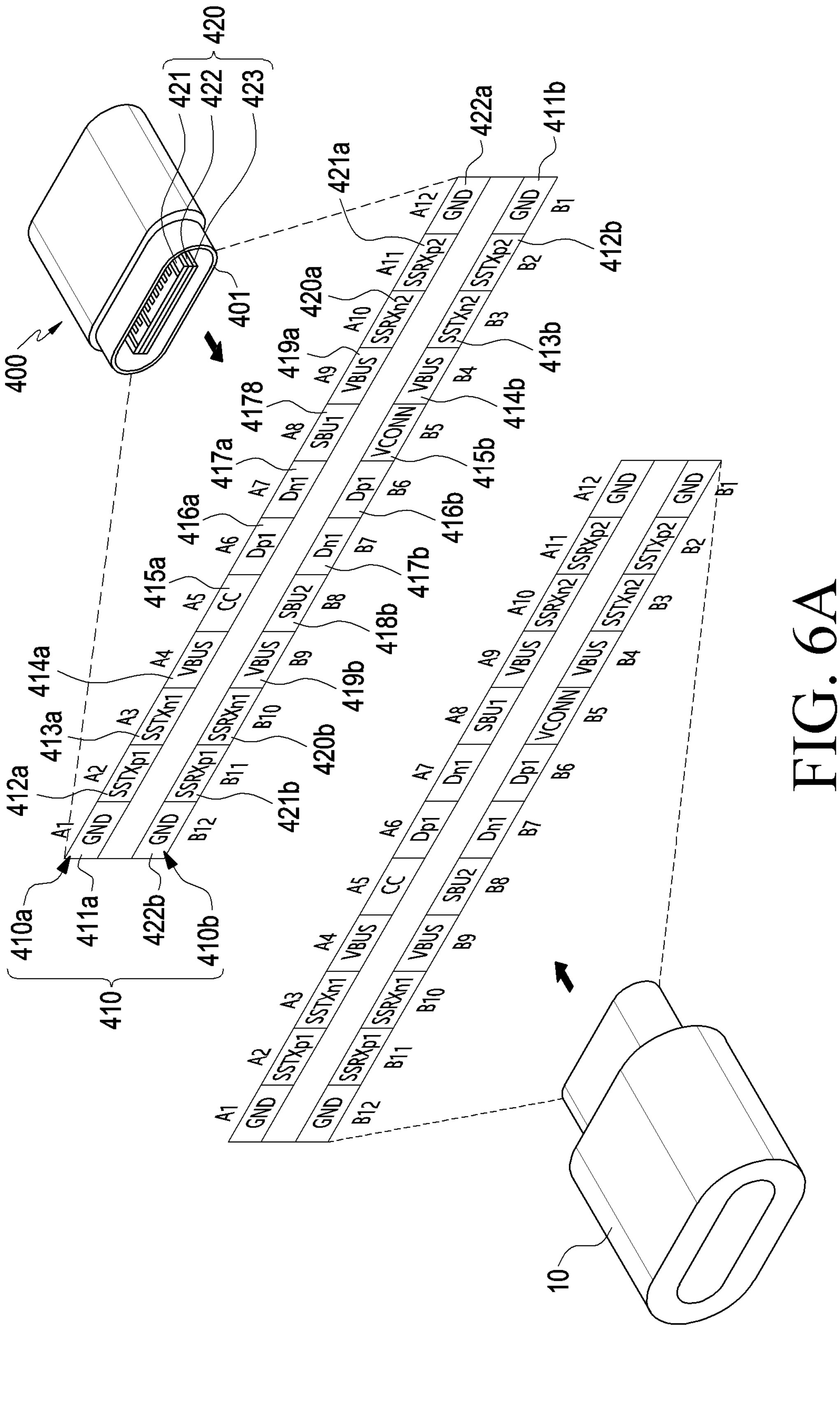
FIG. 6A is a view illustrating an example of the function of a plurality of pins formed in a connector of an electronic device and an external connector according to an embodiment of the disclosure.

FIG. 6A is a view illustrating an example of the function of a plurality of pins 410 formed in a connector 400 of an electronic device 101 and an external connector 10 according to an embodiment of the disclosure.

Figure 6B:
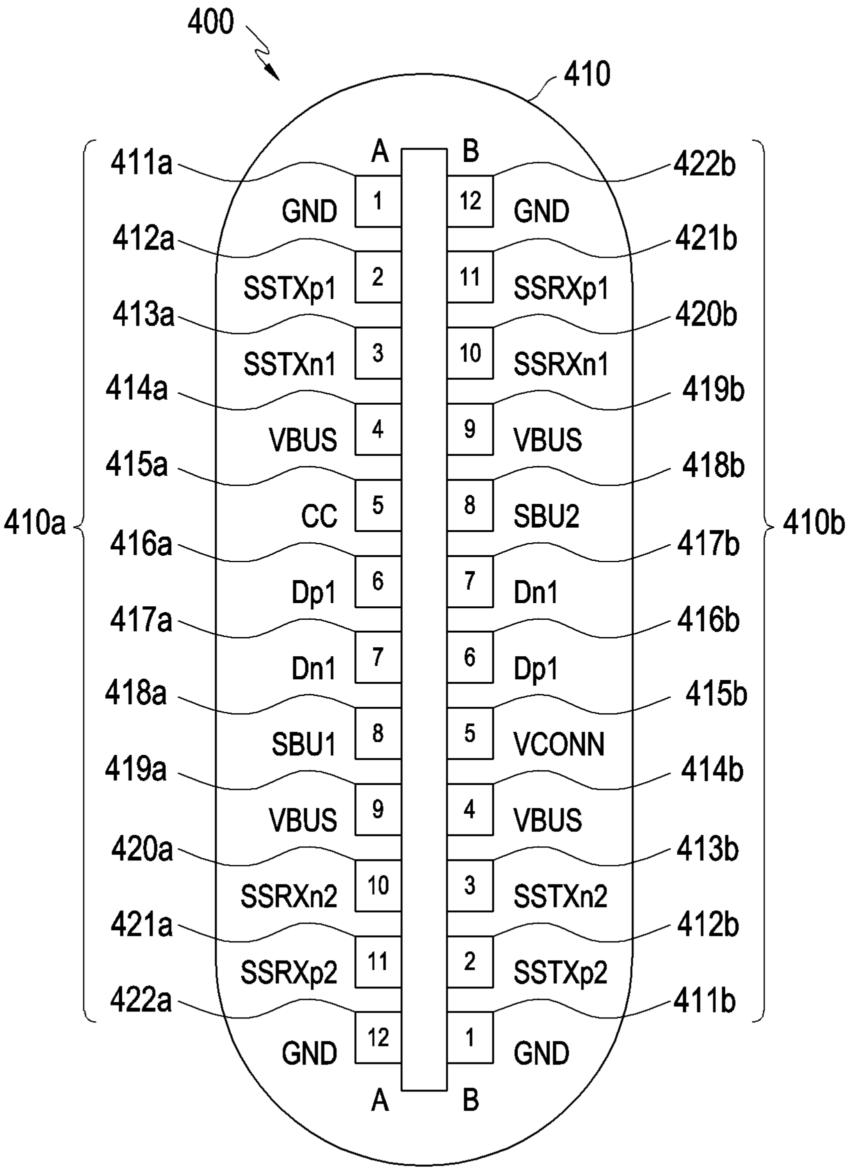

FIGS. 6B and 6C are views illustrating pins of a connector 400 according to an embodiment of the disclosure.

Referring to FIGS. 6A to 6C, the electronic device 101 may include a configuration of a connector 400, a case 401, and a printed circuit board 420. The printed circuit board 420 may include a first layer 421, a second layer 423, and a ground layer 422. The configuration of the connector 400, the case 401, the printed circuit board 420, the first layer 421, the second layer 423, and the ground layer 422 of FIGS. 6A to 6C may be identical in whole or part to the configuration of the connector 300, the case 310, the printed circuit board 320, the first layer 321, the second layer 323, and the ground layer 322 of FIGS. 5A and 5B. The structure of FIGS. 6A to 6C may be selectively coupled to the structure of FIGS. 5A and 5B.

According to an embodiment, the connector 400 (e.g., the connecting terminal 178 of FIG. 1 or the connector 300 of FIGS. 5A and 5B) may be a USB type-C connector. According to an embodiment, the connector 400 may have an outer appearance to allow the external connector 10 to be inserted in any direction, and a printed circuit board 420 including a plurality of pins 410 may be formed inside the connector 400.

According to an embodiment, the printed circuit board 420 may include a first layer 421 (e.g., layer A) including a plurality of first pins 410*a* corresponding to a forward direction, a second layer 423 (e.g., layer B) including a plurality of second pins 410*b* corresponding to a reverse direction, and a ground layer 422.

According to an embodiment, due to reversibility, twenty four pins may be disposed in a mirrored configuration. Due to this structure, the user may overturn by 180-degrees and mount the external connector 10 on the connector 400 of the electronic device 101. A total of twenty four pins (e.g., twelve on the upper surface and twelve on the lower surface) are present on the printed circuit board 420, but the corresponding pins may not be simultaneously used. Which pin(s) is/are to be used may be determined depending on the connecting external connector 10 and the terminal attached to the end of the external connector 10. In this case, symmetrical pins might not be used together. For example, when the SSTXp1 pin 412*a* and the SSTXn1 pin 413*a* are used, the SSTXp1 pin 412*b*, the SSTXn1 pin 413*b*, the SSRXn2 pin 420*a*, and the SSRXp2 pin 421*a* may not be used, and when the SSRXn2 pin 420*b* and the SSRXp2 pin 421*b* are used, the SSRXn2 pin 420*a*, the SSRXp2 pin 421*a*, the SSTXp1 pin 412*b*, and the SSTXn1 pin 413*b* may not be used.

According to an embodiment, the plurality of first pins 410*a* may include twelve pins 411*a*, 412*a*, . . . , 422*a*, and the plurality of second pins 410*b* may include twelve pins 411*b*, 412*b*, 422*b*. For example, the plurality of first pins 410*a* may include the GND pin 411*a*, the SSTXp1 pin 412*a*, the SSTXn1 pin 413*a*, the VBUS pin 414*a*, the CC pin 415*a*, the Dp1 pin 416*a*, the Dn1 pin 417*a*, the SBU1 pin 418*a*, the VBUS pin 419*a*, the SSRXn2 pin 420*a*, the SSRXp2 pin 421*a*, and the GND pin 422*a*. For example, the plurality of second pins 410*b* may include the GND pin 411*b*, the SSTXp2 pin 412*b*, the SSTXn2 pin 413*b*, the VBUS pin 414*b*, the VCONN pin 415*b*, the Dp1 pin 416*b*, the Dn1 pin 417*b*, the SBU2 pin 418*b*, the VBUS pin 419*b*, the SSRXn1 pin 420*b*, the SSRXp1 pin 421*b*, and the GND pin 422*b*.

According to an embodiment, the external connector 10 may include twelve pins on the upper end to contact the twelve pins 411*a*, 412*a*, . . . , 422*a* of the first layer 410*a* formed on the upper surface of the printed circuit board 420 and may include twelve pins be on the lower end to contact the twelve pins 411*b*, 412*b*, 422*b* of the second layer 410*b* formed on the lower surface of the printed circuit board 420. The number of pins configured in the external connector 10 may vary depending on the type of accessory. Further, the number of CC pins of the external connector 10 may be one or two depending on the type. For example, the arrangement order of the twelve pins formed on the upper surface may be the same as the arrangement order of the twelve pins formed on the lower surface so that the external connector 10 may be plugged in any direction. Due to this structure, the user may plug the external connector 10 into the connector 300 of the electronic device 101 in a state of being rotated 180 degrees.

According to an embodiment, the plurality of first pins 410*a* may include one or more first ground pins, e.g., the GND pins 411*a* and 422*a*, and one or more first signal pins, e.g., the SSTXp1 pin 412*a*, the SSTXn1 pin 413*a*, the VBUS pin 414*a*, the CC pin 415*a*, the Dp1 pin 416*a*, the Dn1 pin 417*a*, the SBU1 pin 418*a*, the VBUS pin 419*a*, the SSRXn2 pin 420*a*, and the SSRXp2 pin 421*a*, and the plurality of second pins 410*b* may include one or more second ground pins, e.g., the GNDp2 pins 411*b* and 422*b* and one or more second signal pins, e.g., the SSTXp2 pin 412*b*, the SSTXn2 pin 413*b*, the VBUS pin 414*b*, the VCONN pin 415*b*, the Dp1 pin 416*b*, the Dn1 pin 417*b*, the SBU2 pin 418*b*, the VBUS pin 419*b*, the SSRXn1 pin 420*b*, and the SSRXp1 pin 421*b*.

According to an embodiment, referring to FIG. 6B, the SSTXp1 pin and the SSTXp2 pin 412*a* and 412*b*, the SSTXn1 pin and the SSTXn2 pin 413*a* and 413*b* may be pins for super speed transmission (TX) capable of fast data transmission, the Vbus pins 414*a*, 419*a*, 414*b*, and 419*b* may be pins for USB cable charging power, the CC pin 415*a* may be a pin serving as an identification terminal, the VCONN pin 415*b* may be a pin for supporting plug power, the Dp1 pins 416*a* and 416*b*, and the Dn1 pins 417*a* and 417*b* may be pins for USB signals in different bidirectional directions, the SBU1 pin and the SBU2 pins 418*a* and 418*b* may be extra pins that may be used for various signals (e.g., audio signals, display signals, etc.), and the SSRXn2 pin and the SSRXn1 pin 420*a* and 420*b*, and the SSRXp2 pin and the SSRXp1 pin 421*a* and 421*b* may be pins for super speed reception (RX) capable of fast data reception.

According to an embodiment, one or more first signal pins, e.g., at least one first signal pin among the SSTXp1 pin 412*a*, the SSTXn1 pin 413*a*, the VBUS pin 414*a*, the CC pin 415*a*, the Dp1 pin 416*a*, the Dn1 pin 417*a*, the SBU1 pin 418*a*, the VBUS pin 419*a*, the SSRXn2 pin 420*a*, or the SSRXp2 pin 421*a*, may be selectively connected to a circuit (e.g., the audio module 460) having a designated function and a wireless communication circuit (e.g., the broadcasting module 470) capable of receiving wireless communication data (e.g., broadcast data), and one or more second signal pins, e.g., at least one second signal pin among the SSTXp2 pin 412*b*, SSTXn2 pin 413*b*, VBUS pin 414*b*, VCONN pin 415*b*, Dp1 pin 416*b*, Dn1 pin 417*b*, SBU2 pin 418*b*, VBUS pin 419*b*, SSRXn1 pin 420*b*, or SSRXp1 pin 421*b* may be selectively connected to a circuit (e.g., the audio module 170 of FIG. 1) having a designated function or a circuit (e.g., the communication module 190 of FIG. 1) capable of receiving wireless communication data (e.g., broadcast data).

According to an embodiment, one or more first ground pins, e.g., at least one first ground pin of the GND pins 411*a* and 422*a*, may be selectively connected to a communication module (e.g., the communication module 190 of FIG. 1) capable of receiving wireless communication data (e.g., broadcast data), and one or more second ground pins, e.g., at least one second ground pin of the GND pins 411*b* and 422*b*, may be selectively connected to a communication module (e.g., the communication module 190 of FIG. 1) capable of receiving wireless communication data (e.g., broadcast data).

According to an embodiment, all of the first GND pin 411*a* and/or 422*a* and the second GND pin 411*b* and/or 422*b* may be connected to the communication module (e.g., the communication module 190 of FIG. 1) capable of receiving wireless communication data (e.g., broadcast data). For example, when all of the first GND pin 411*a* and/or 422*a* and the second GND pin 411*b* and/or 422*b* are connected to the external connector 10 and the wireless communication circuit, a signal corresponding to wireless communication data received by the external antenna connected to the external connector 10 may be transferred to the wireless communication circuit through each of the first GND pin 411*a* and/or 422*a* and the second GND pin 411*b* and/or 422*b*. According to an embodiment, each of the first GND pin 411*a* and/or 422*a* and the second GND pin 411*b* and/or 422*b* may receive a signal corresponding to different wireless communication data. According to an embodiment, each of the first GND pin 411*a* and/or 422*a* and the second GND pin 411*b* and/or 422*b* may be simultaneously connected to the external antenna through the external connector 10. When each of the first GND pin 411*a* and/or 422*a* and the second GND pin 411*b* and/or 422*b* is simultaneously connected to the external antenna, the first GND pin 411*a* and/or 422*a* and the external antenna serve as the first antenna, and the second GND pin 411*b* and/or 422*b* and the external antenna serve as the second antenna so that a diversity antenna may be configured.

According to an embodiment, it has been described that the first signal pin and the second signal pin and the first ground pin and the second ground pin are used as pins capable of being selectively connected to the communication module 470. However, according to an embodiment, at least a portion of the latch structure may be designated as a latch pin capable of being selectively connected to the communication module (e.g., the communication module 190 of FIG. 1), and the latch pin may be selectively connected to the communication module (e.g., the communication module 190 of FIG. 1).

Figure 7A:
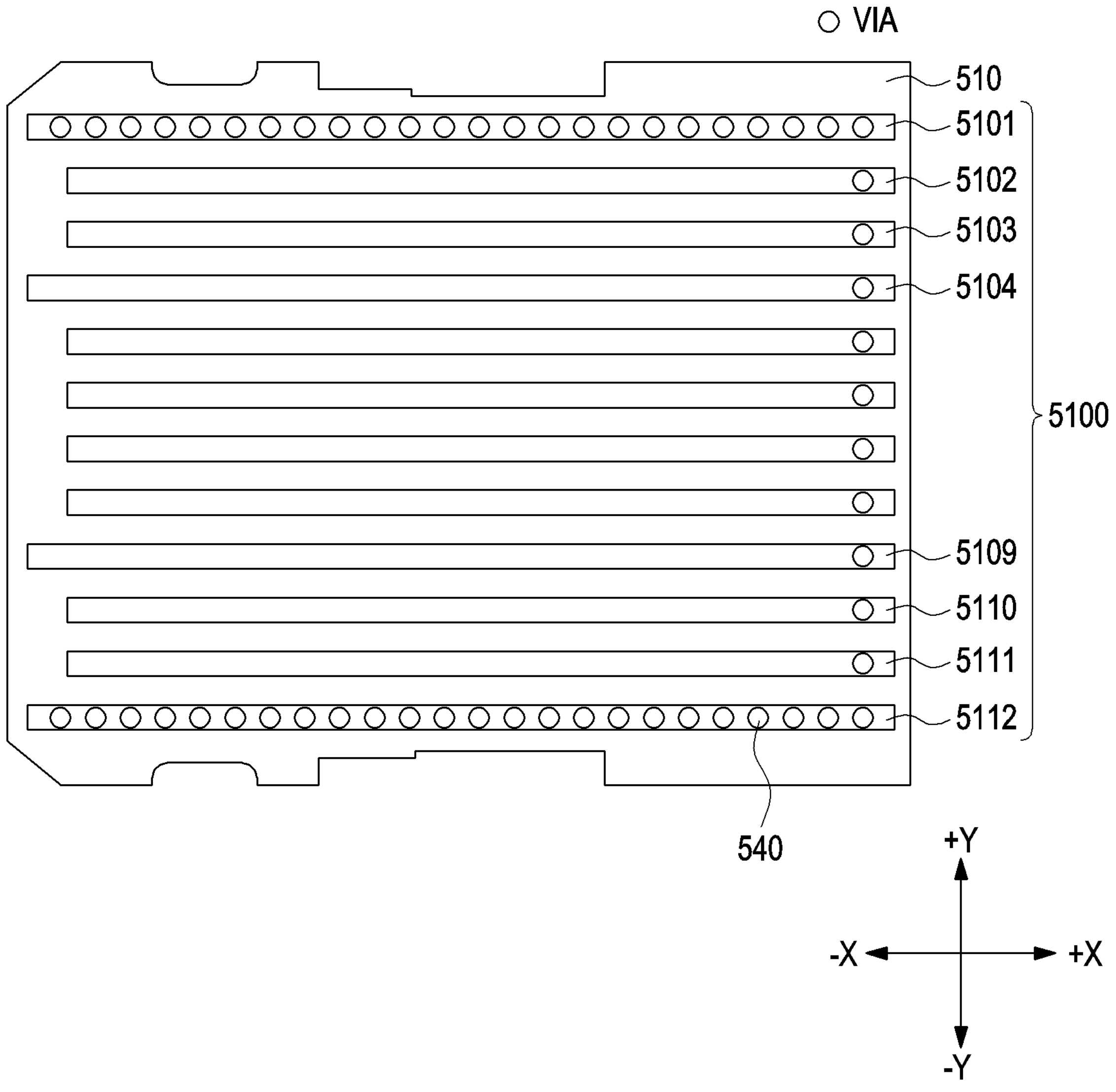
FIGS. 7A and 7B are front views illustrating a first layer or a second layer of a connector of an electronic device according to an embodiment of the disclosure.
Figure 7B:
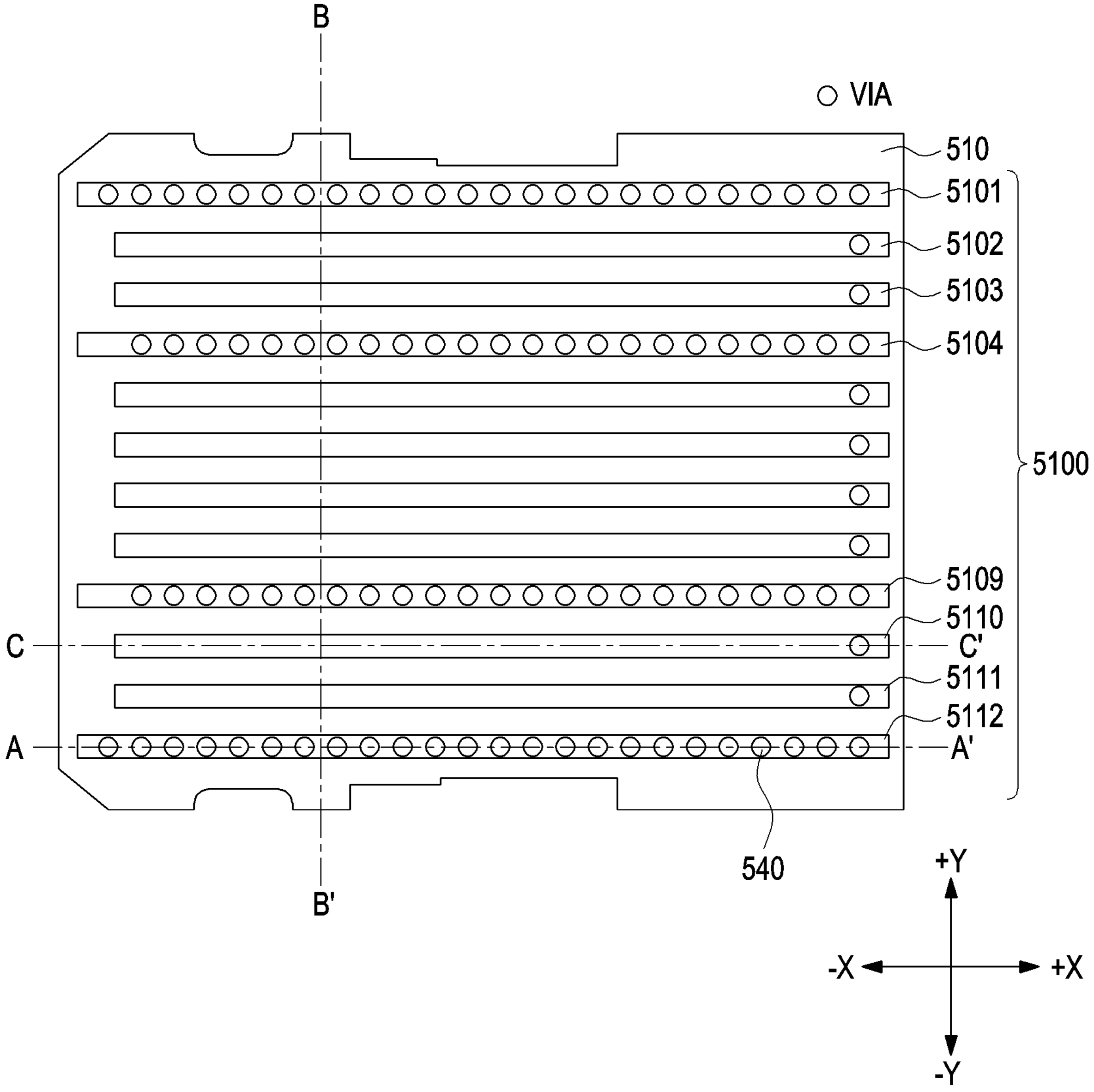

FIGS. 7A and 7B are front views illustrating a first layer 510 of a connector of an electronic device according to an embodiment of the disclosure.

Figure 8:
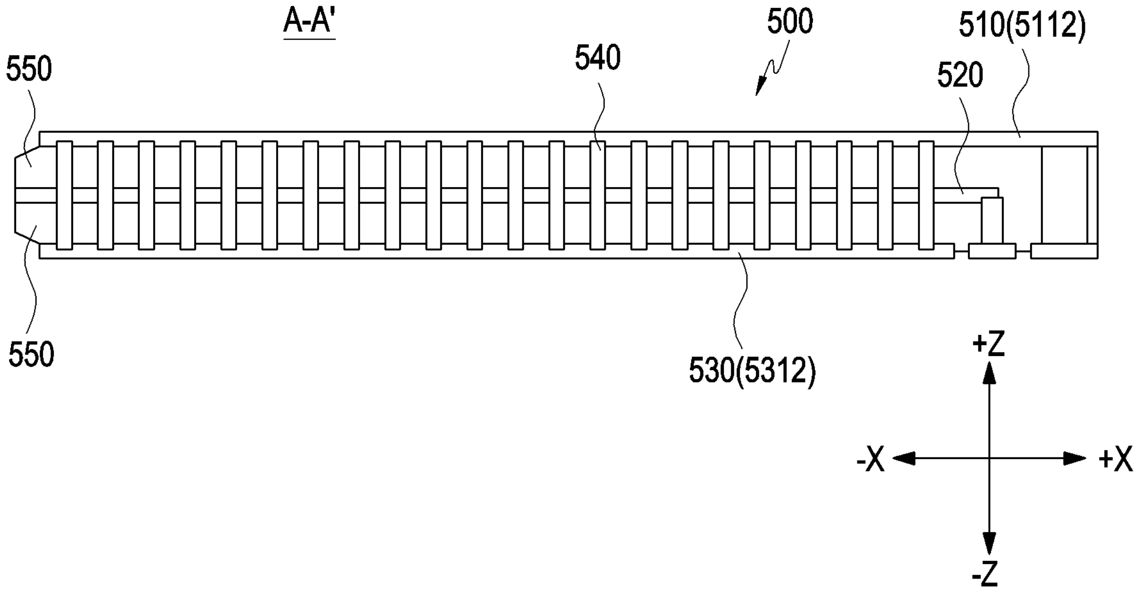
FIG. 8 is a cross-sectional view taken along line A-A' of the connector of FIG. 7B according to an embodiment of the disclosure.

FIG. 8 is a cross-sectional view taken along line A-A' of the connector of FIG. 7B according to an embodiment of the disclosure.

Figure 9:
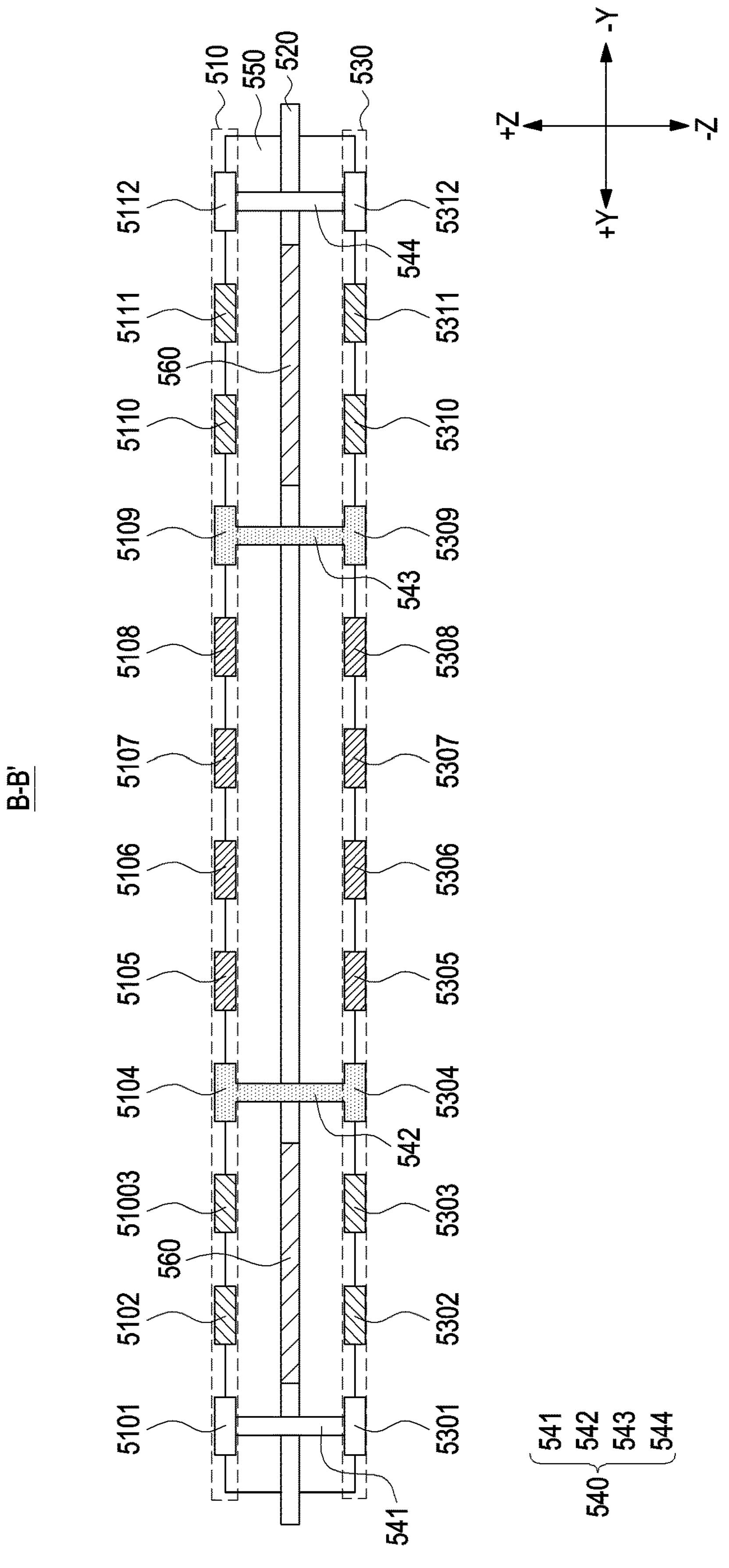
FIG. 9 is a cross-sectional view taken along line B-B' of the connector of FIG. 7B according to an embodiment of the disclosure.

FIG. 9 is a cross-sectional view taken along line B-B' of the connector of FIG. 7B according to an embodiment of the disclosure.

Referring to FIGS. 7A to 9, the electronic device 101 may include a configuration of a connector 400, a case 401, and a printed circuit board 500. The printed circuit board 500 may include a first layer 510, a second layer 530, a ground layer 520, and an insulating layer 550. The configuration of the connector 400, the case 401, the printed circuit board 500, the first layer 510, the second layer 530, and the ground layer 520 of FIGS. 7A to 9 may be identical in whole or part to the configuration of the configuration of the connector 400, the case 401, the printed circuit board 420, the first layer 421, the second layer 423, and the ground layer 422 of FIGS. 6A to 6C. The structure of FIGS. 7A to 9 may be selectively coupled to the structure of FIGS. 6A to 6C.

According to an embodiment, the printed circuit board 500 may include a plurality of conductive layers (e.g., a first layer 510, a second layer 530, and a ground layer 520) and an insulating layer 550 stacked between the conductive layers.

The second layer 530 may form one surface of the printed circuit board 500 that faces a downward direction (e.g., the −Z-axis direction of FIG. 8). The second layer 530 may form one surface of the printed circuit board 500 facing downward (e.g., the −Z-axis direction of FIG. 8). The ground layer 520 may be disposed between the first layer 510 and the second layer 530.

According to an embodiment, a plurality of first pins 5100 may be disposed on the first layer 510. The plurality of first pins 5100 may include, e.g., about twelve pins. The plurality of first pins 5100 may be arranged to be spaced apart from each other at regular intervals in the Y-axis direction. Each pin constituting the plurality of first pins 5100 may have a bar shape elongated in the X-axis direction. The plurality of first pins 5100 may be substantially the same as the plurality of first pins 410*a* of FIGS. 6A to 6C.

According to an embodiment, the plurality of first pins 5100 may include at least one first ground pin. For example, the 1-1th pin 5101 and the 1-12th pin 5112 disposed at the edge among the plurality of first pins 5100 may be GND pins (411*a* and 422*a* of FIG. 6A). According to an embodiment, the plurality of first pins 5100 may include at least one first signal pin. For example, among the plurality of first pins 5100, the 1-2th pin 5102, the 1-3th pin 5103, the 1-10th pin 5110, and the 1-11th pin 5111 may be SS pins for super speed transmission (TX) capable of fast data transmission. For example, among the plurality of first pins 5100, the 1-4th pin 5104 and the 1-9th pin 5109 may be VBUS pins for USB cable charging power.

According to an embodiment, a plurality of second pins 5300 may be disposed on the second layer 530. The plurality of second pins 5300 may include, e.g., twelve pins. The pins may be arranged to be spaced apart from each other at regular intervals in the Y-axis direction. Each pin constituting the plurality of second pins 5300 may have a bar shape elongated in the X-axis direction. The plurality of second pins 5300 may be substantially the same as the plurality of second pins 410*b* of FIGS. 6A to 6C.

According to an embodiment, the plurality of second pins 5300 may include at least one second ground pin. For example, the 2-1th pin 5301 and the 2-2th pin 5312 disposed at the edge of the plurality of second pins 5300 may be GND pins. According to an embodiment, the plurality of second pins 5300 may include at least one second signal pin. For example, among the plurality of second pins 5300, the 2-2th pin 5302, the 2-3th pin 5303, the 2-10th pin 5310, and the 2-11th pin 5311 may be SS pins for super speed transmission (TX) capable of fast data transmission. For example, among the plurality of second pins 5300, the 2-4th pin 5304 and the 2-9th pin 5309 may be VBUS pins for USB cable charging power.

According to an embodiment, the plurality of first pins 5100 and the plurality of second pins 5300 may be vertically symmetrical. For example, the first ground pins 5101 and 5112 and the second ground pins 5301 and 5312 may be disposed at corresponding positions with respect to the Z-axis. For example, the first signal pin and the second signal pin may be disposed at corresponding positions with respect to the Z-axis.

According to an embodiment, each pin constituting the plurality of first pins 5100 and the plurality of second pins 5300 may be formed to be connected through at least one via 540.

According to an embodiment, the first ground pins 5101 and 5112 and the second ground pins 5301 and 5312 may be formed to be connected through at least one via 540. The first ground pins 5101 and 5112 and the second ground pins 5301 and 5312 may be connected to the ground layer 520 through at least one via 540. The at least one first ground pin, the at least one second ground pin, and the at least one ground layer are configured to be connected through at least one via. Signal performance may be enhanced by strongly connecting the first ground pins 5101 and 5112, the second ground pins 5301 and 5312, and the ground layer 520 through the via 540. It is possible to minimize noise emitted through the case by strengthening the connection of the ground. Heat may be dissipated by strengthening the connection of the ground to prevent heat generation.

According to an embodiment, referring to FIG. 9, the first ground pins 5101 and 5112 and the second ground pins 5301 and 5312 may be formed to be connected through a plurality of vias 540 arranged to be spaced apart from each other at regular intervals in the X-axis direction. The first ground pins 5101 and 5112 and the second ground pins 5301 and 5312 may be connected to the ground layer 520 through a plurality of vias 541 and 544. Side radiation may be enhanced by forming the plurality of vias 542 and 544 arranged to be spaced apart from the first ground pins 5101 and 5112 and the second ground pins 5301 and 5312 at regular intervals in the X-axis direction. For example, the plurality of vias may perform a shielding function to prevent electromagnetic waves generated from the signal line from being radiated to the side.

According to an embodiment, referring to FIG. 7B, the first power source (vbus) pin and the second power source (vbus) pin may be formed to be connected through at least one via 542 or 543. The first power source (vbus) pin and the second power source (vbus) pin may be connected to the ground layer 520 through at least one via 542 or 543. The first power source (vbus) pin, the second power source (vbus) pin, and the ground layer 520 may be strongly connected through vias 542 and 543 to enhance allowable current to correspond to high-speed charging.

According to an embodiment, the first power source (vbus) pin and the second power source (vbus) pin may be formed to be connected through a plurality of vias 542 and 543 arranged to be spaced apart from each other at regular intervals in the X-axis direction. The first power source (vbus) pin and the second power source (vbus) pin may be connected to the ground layer 520 through the plurality of vias 540. Side radiation may be enhanced by forming the plurality of vias 542 and 543 arranged to be spaced apart from the first power source (vbus) pin and the second power source (vbus) pin at regular intervals in the X-axis direction.

According to an embodiment, the ground layer 520 may replace a mid-plate, which is typically embedded in a connector, and may perform substantially the same function. The ground layer 520 may be disposed between the first layer 510 and the second layer 530 and may be disposed to maintain a substantially constant distance from the first layer 510 or the second layer 530. Signal performance may be enhanced by strongly connecting the first ground pins 5101 and 5112, the second ground pins 5301 and 5312, and the ground layer 520 through the via 540. It is possible to minimize noise emitted through the case by strengthening the connection of the ground. Heat may be dissipated by strengthening the connection of the ground to prevent heat generation.

According to an embodiment, the distance between the ground layer 520 and the first layer 510 may remain constant. According to an embodiment, the distance between the ground layer 520 and the second layer 530 may remain constant. Accordingly, the signal impedance may remain constant.

According to an embodiment, referring to FIG. 9, at least a portion of the ground electrode constituting the ground layer 520 may be disposed in a mesh form. At least a portion of the ground layer 520 may include a mesh ground 560. When at least some of the ground electrodes constituting the ground layer 520 are disposed in a mesh form, impedance may increase, thereby enhancing impedance asymmetry. For example, referring to FIG. 9, the ground electrode at the position corresponding to the position of the super speed TX pins 5102, 5103, 5110, 5111, 5302, 5303, 5310, and 5311 among the plurality of first pins 5100 and the plurality of second pins 5300 with respect to the Z axis may be a mesh ground 560 disposed in a mesh form. Reflection may be minimized by maintaining impedance matching in the portion where the super speed TX pin is disposed.

According to an embodiment, the ground layer 520 may provide a stable return path for the plurality of first pins 5100 and the plurality of second pins 5300. In general, since a mid-plate is not suitable as a return path, the VBUS pins and GND pins on two opposite sides are used as a main return path, which may cause impedance asymmetry that causes common mode noise. Common noise may mean noise commonly generated from two lines of a transmission path in a symmetric automatic system. According to an embodiment of the disclosure, resonance of a signal line and electronic noise interference (EMI) may be mitigated by using the ground layer 520 serving as a mid-plate as a return path.

Figure 10A:
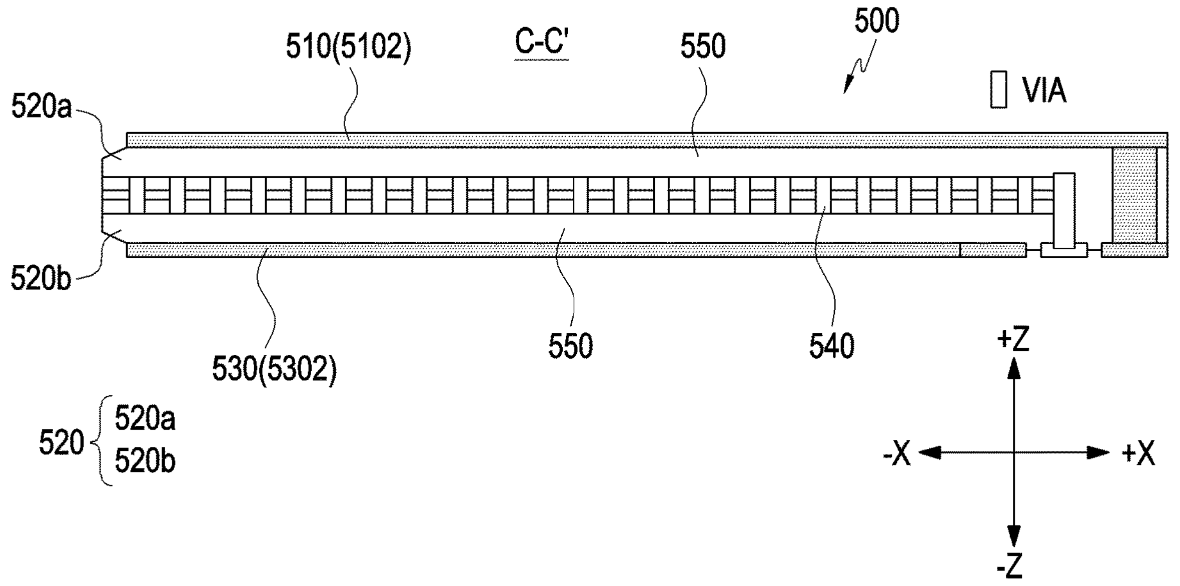
FIGS. 10A and 10B are cross-sectional views taken along line C-C' of the connector of FIG. 7B according to an embodiment of the disclosure.
Figure 10B:
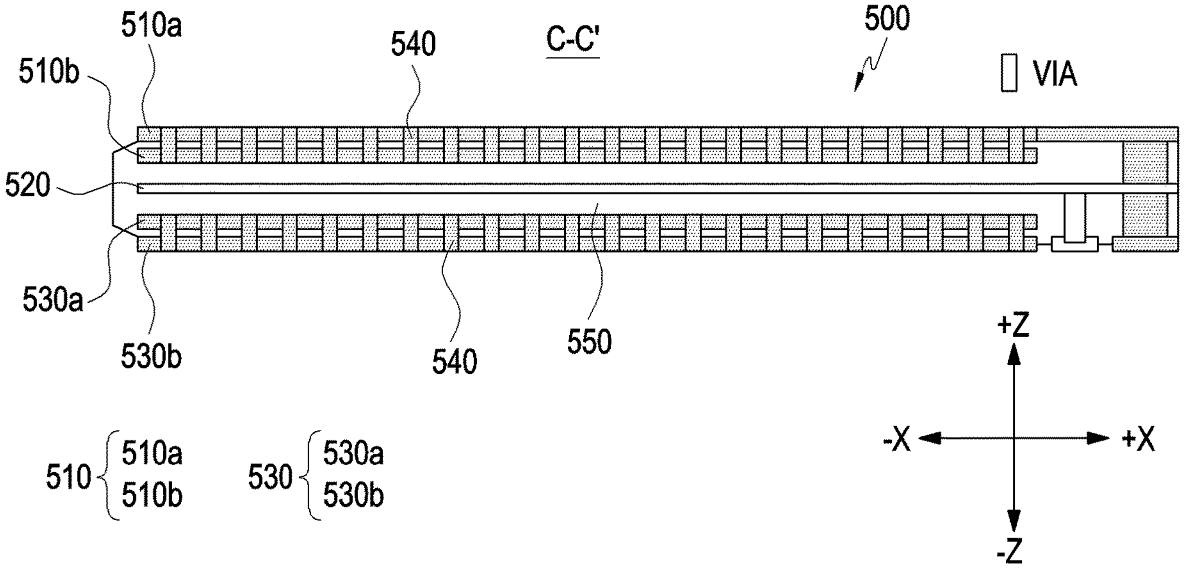

FIGS. 10A and 10B are cross-sectional views taken along line C-C' of the connector of FIG. 7B according to an embodiment of the disclosure.

Referring to FIGS. 10A and 10B, the electronic device 101 may include a connector 400, a case 401, and a printed circuit board 500. The printed circuit board 500 may include a first layer 510, a second layer 530, and a ground layer 520. The configuration of the connector 400, the case 401, the printed circuit board 500, the first layer 510, the second layer 530, and the ground layer 520 of FIGS. 10A and 10B may be identical in whole or part to the configuration of the connector 400, the case 401, the printed circuit board 420, the first layer 421, the second layer 422, and the ground layer of FIGS. 6A to 6C. The structures of FIGS. 10A and 10B may be selectively combinable with the structures of FIGS. 7A to 8.

According to an embodiment, it is possible to enhance the mechanical strength of the printed circuit board 500 by increasing the thickness of the plurality of conductive layers of the printed circuit board 500. For example, the thickness of at least one of the first layer 510, the second layer 530, and the ground layer 520 may be increased.

According to an embodiment, the mechanical strength of the printed circuit board 500 may be enhanced by increasing the number of conductive layers of the printed circuit board 500. According to an embodiment, referring to FIG. 10A, the ground layer 520 may be composed of a plurality of layers. The ground layer 520 may include a first ground layer 520*a* and a second ground layer 520*b*. The first ground layer 520*a* and the second ground layer 520*b* may be connected through a plurality of vias 540 arranged to be spaced apart in the X-axis direction. According to an embodiment, referring to FIG. 10B, the first layer 510 and/or the second layer 530 may be composed of a plurality of layers. The first layer 510 may include a 1-1th layer 510*a* and a 1-2th layer 510*b* disposed under the 1-1th layer. The 1-1th layer 510*a* and the 1-2th layer 510*b* may be connected through a plurality of vias 540 disposed apart from each other in the X-axis direction. The second layer 530 may include a 2-1th layer 530*a* and a 2-2th layer 530*b* disposed under the 2-1th layer 530*a*. The 2-1th layer 530*a* and the 2-2th layer 530*b* may be connected through a plurality of vias 540 arranged to be spaced apart in the X-axis direction.

According to an embodiment, the insulating layer 550 may be disposed between the conductive layers (e.g., the first layer 510, the second layer 530, and the ground layer 520). The insulating layer 550 may be referred to as a prepreg. The insulating layer 550 may be formed of a dielectric material, and the dielectric material may include FR4, which is a glass fiber resin, as an intermediate material of a composite material in which a liquid synthetic resin such as an epoxy resin is penetrated into a fiber reinforcing material such as carbon fiber or glass fiber. FR4 is composed of resin and glass fiber, and the rigidity of the printed circuit board 500 may be enhanced by increasing the glass fiber content. For example, the dielectric constant may be rendered to be about 0.02 F/m or less by increasing the glass fiber content. For example, the dielectric constant may be rendered to be about 0.005 F/m or less by increasing the glass fiber content.

Figure 11:
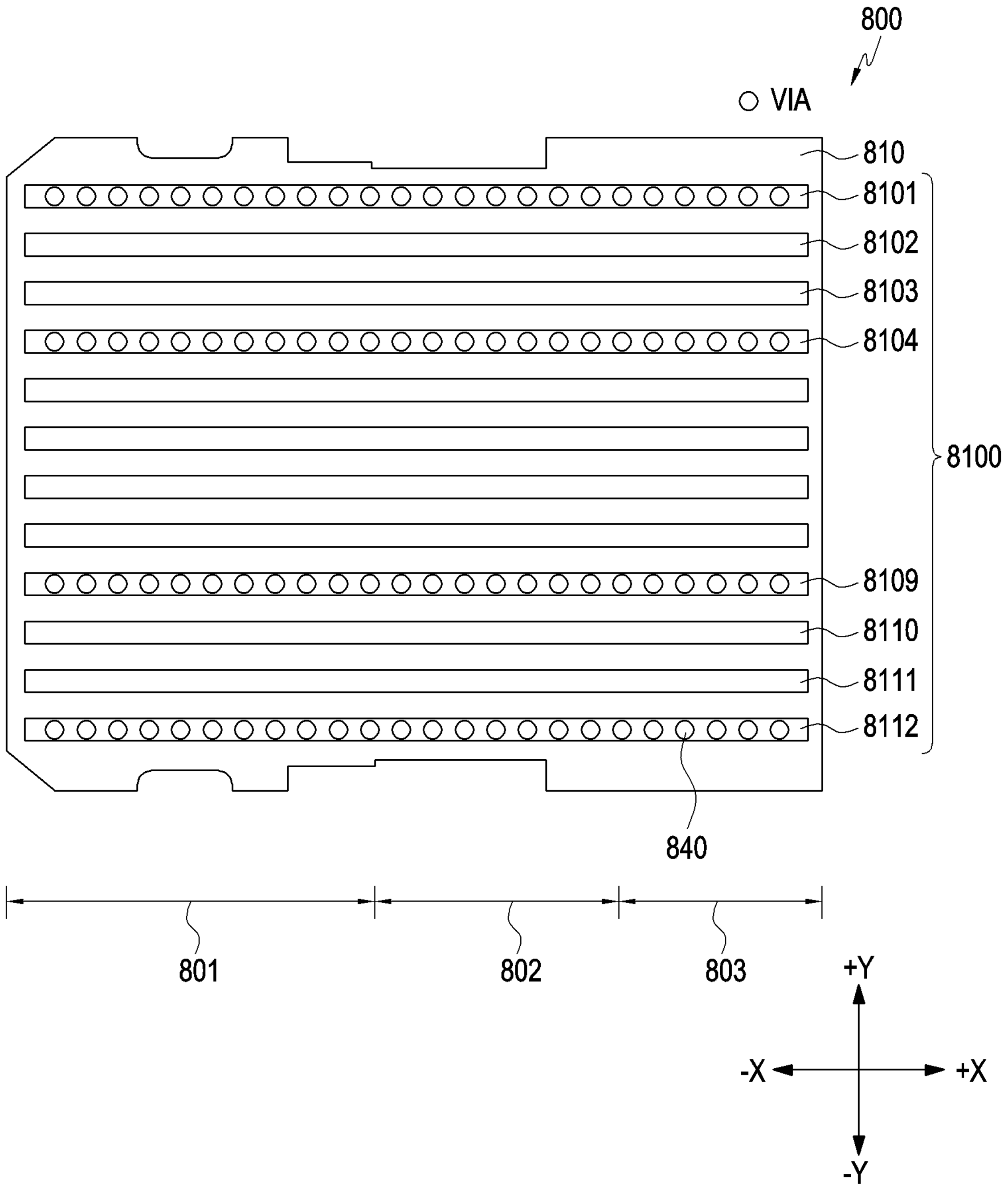
FIG. 11 is a front view illustrating a first layer or a second layer of a connector of an electronic device according to an embodiment of the disclosure.
Figure 12:
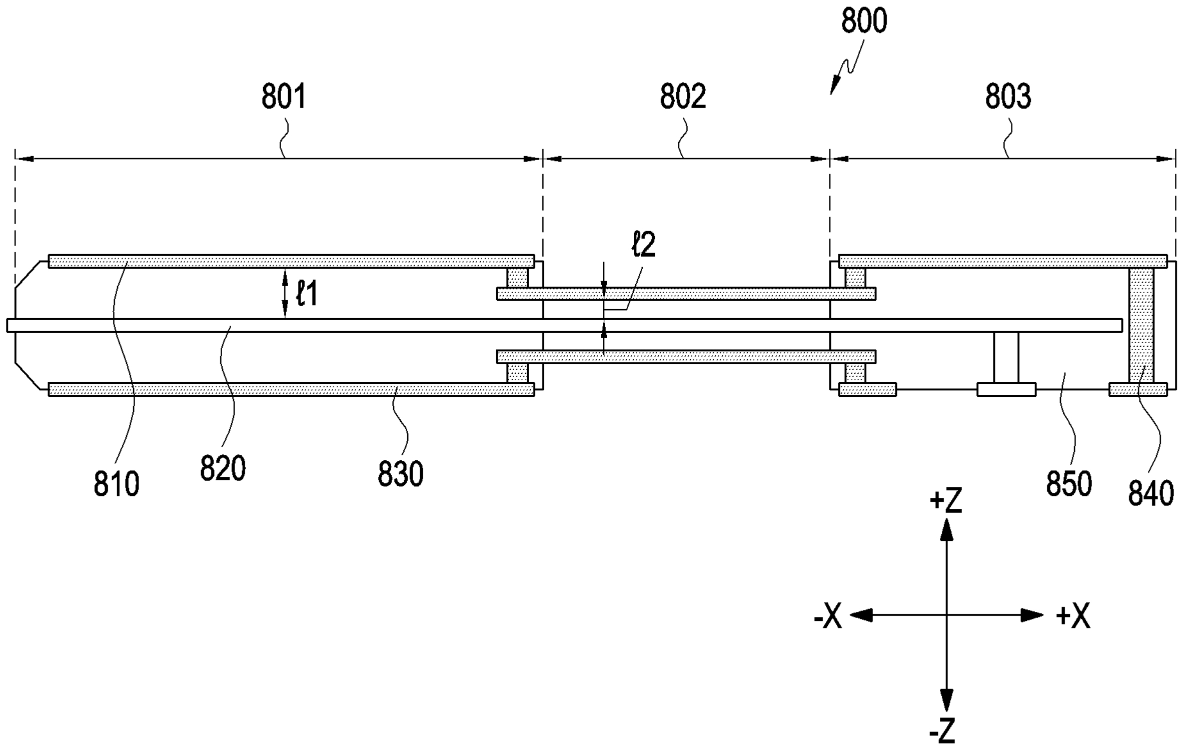
FIG. 12 is a cross-sectional view illustrating a printed circuit board according to an embodiment of the disclosure.
Figure 13:
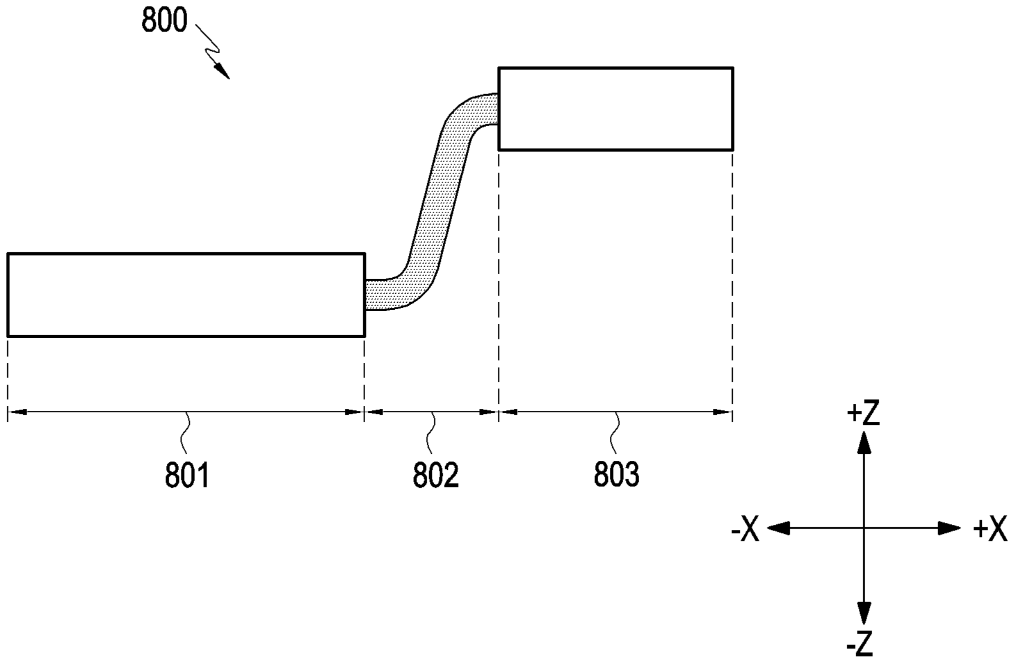
FIG. 13 is a view schematically illustrating a state in which a printed circuit board is mounted in an electronic device according to an embodiment of the disclosure.
Figure 14:
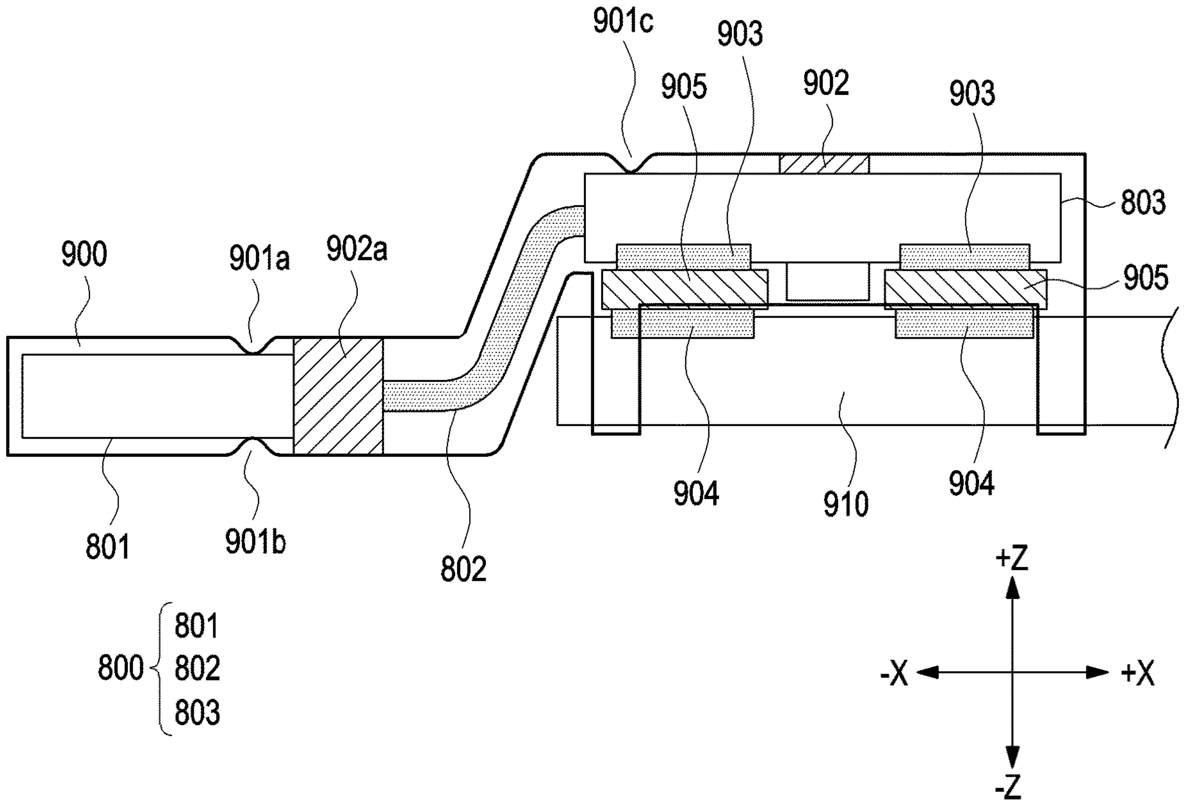
FIG. 14 is a view schematically illustrating an arrangement and coupling method of a printed circuit board and a main printed circuit board according to an embodiment of the disclosure.

FIG. 11 is a front view illustrating a first layer or a second layer of a connector of an electronic device according to an embodiment of the disclosure. FIG. 12 is a cross-sectional view illustrating a printed circuit board according to an embodiment of the disclosure. FIG. 13 is a view schematically illustrating a state in which a printed circuit board is mounted in an electronic device according to an embodiment of the disclosure. FIG. 14 is a view schematically illustrating an arrangement and coupling method of a printed circuit board and a main printed circuit board according to an embodiment of the disclosure.

Referring to FIGS. 11 to 14, the electronic device 101 may include a configuration of a connector 400, a case 401, and a printed circuit board 800. The printed circuit board 800 may include a first layer 810, a second layer 830, and a ground layer 820. The configuration of the connector 400, the case 401, the printed circuit board 800, the first layer 810, the second layer 830, and the ground layer 820 of FIGS. 11 to 14 may be identical in whole or part to the configuration of the configuration of the connector 400, the case 401, the printed circuit board 420, the first layer 421, the second layer 422, and the ground layer of FIGS. 6A to 6C. The structure of FIGS. 11 to 14 may be selectively combinable with the structures of FIGS. 10A and 10B.

According to an embodiment, the printed circuit board 800 may be composed of a rigid printed circuit board and a flexible printed circuit board (RF PCB applied) to correspond to various mounting components and a shape of a device having a vertical stepped structure.

The printed circuit board 800 may include a first area 801 formed of a rigid printed circuit board, a second area 802 extending from the first area 801 and formed of a flexible printed circuit board, and a third area 803 extending from the second area 802 and formed of a rigid printed circuit board. Accordingly, when the first area 801 and the third area 803 are mounted in the electronic device 101, the Z-axis positions may be different.

According to an embodiment, the Z-axis heights of the first area 801, the second area 802, and the third area 803 may be different. According to an embodiment, the heights of the ground layers 820 of the first area 801, the second area 802, and the third area 803 may be the same, but the Z-axis heights of the first layer 810 and the second layer 830 may be different (see FIG. 13).

According to an embodiment, the distance between the first layer 810 and the ground layer 820 may differ in the first area 801, the second area 802, and the third area 803. The distance between the second layer 830 and the ground layer 820 may differ in the first area 801, the second area 802, and the third area 803. For example, the distance between the first layer 810 and the ground layer 820 of the first area 801 and the third area 803 formed of the rigid printed circuit board and the distance between the second layer 830 and the ground layer 820 may be a first length l1, and the distance between the first layer 810 and the ground layer 820 of the second area 802 formed of the flexible printed circuit board and the distance between the second layer 830 and the ground layer 820 may be a second length l2. For example, the second length l2 may be shorter than the first length l1. When the distance between the ground layer 820 and the first layer 810 differs from the distance between the second layer 830 and the ground layer 820, an impedance change may occur. Therefore, the ground electrode formed in the ground layer 820 of the second area 802 may be configured as a mesh ground 560 disposed in a mesh form. The ground electrode formed on the ground layer 820 of the second area 802 may be disposed in a mesh form to maintain impedance.

According to an embodiment, referring to FIG. 14, the printed circuit board 800 may be connected to a shell 900. The printed circuit board 800 may be surrounded by the shell 900. For example, the shell 900 of the printed circuit board 800 may be formed by insert-injection molding. According to an embodiment, the printed circuit board 800 may be fixed to the shell 900 by molds 902*a* and 902*b*. The relative positions of the printed circuit board 800 and the shell 900 may be fixed by the molds 902*a* and 902*b*. The shell 900 may be electrically connected to the GND of the printed circuit board 800 using a plurality of spring structures 901*a*, 901*b*, and 901*c*. According to an embodiment, the shell 900 may include metal.

According to an embodiment, referring to FIG. 14, the main printed circuit board 910 and at least a portion of the printed circuit board 800 according to the present invention may contact each other. According to an embodiment, the third portion 803 of the printed circuit board 800 may be disposed on the main printed circuit board 910. The third portion 803 and the main printed circuit board 900 may be electrically connected to each other through a plurality of SMT contact pads 903 and 904. For example, to perform surface mounting (surface mounter technology: SMT) on the main printed circuit board 900, the surface mounting (SMT) may be performed with a pad of the socket PCB. In this case, the plating thickness may be adjusted as necessary. According to an embodiment, the SMT contact pad 903 connected to the printed circuit board 800 and the SMT contact pad 904 connected to the main printed circuit board 901 may be contacted and/or connected through a solder. According to another embodiment, the plurality of pins of the printed circuit board 800 may be rearranged in one row to increase wiring freedom and enhance electrical inspection convenience. For example, when all pins in one row are exposed to the outside, a measurement inspection may be possible. According to another embodiment, the third portion 803 and the main printed circuit board 910 may be electrically connected to each other through a B2B connector (not shown).

Recently, as the signal passes through the connector at higher speed, the electric length increases, so that the signal performance and shielding importance of the connector itself continue to increase. In general, USB type-C sockets are formed by molding (pins) and injection-molding (device), so that design precision or freedom thereof may be low. Due to a plurality of holes formed in the mid-plate that maintains the rigidity of the center of the injection-molded product, and a change in impedance due to an uneven distance between the mid-plate and the substrate, the signal performance may be deteriorated, and the connection between the GNDs may weaken, so that the shielding performance may be deteriorated even from the EMI perspective. Since the mid-plate and the ground pin are not connected, performance such as of high-speed signal transmission and noise emission restriction may be affected.

In the electronic device according to an embodiment of the present invention, the first ground pin and the second ground pin may be formed to be connected through at least one via 540. Signal performance may be enhanced by strongly connecting the first ground pins 5101 and 5112, the second ground pins 5301 and 5312, and the ground layer 520 through the via 540. It is possible to minimize noise emitted through the case by strengthening the connection of the ground. Heat may be dissipated by strengthening the connection of the ground to prevent heat generation.

According to an embodiment, the ground layer 520 may replace a mid-plate, which is typically embedded in a connector, and may perform substantially the same function. The ground layer 520 may be disposed to maintain a substantially constant distance from the first layer 510 or the second layer 530. Signal performance may be enhanced by strongly connecting the first ground pin, the second ground pin, and the ground layer through the via 540. It is possible to minimize noise emitted through the case by strengthening the connection of the ground. Heat may be dissipated by strengthening the connection of the ground to prevent heat generation.

The disclosure is not limited to the foregoing embodiments but various modifications or changes may rather be made thereto without departing from the spirit and scope of the disclosure.

An electronic device according to an embodiment of the disclosure may comprise a housing (110 of FIG. 2) and a connector (300 of FIG. 5A; 400 of FIG. 6A) disposed in the housing. The connector may include a case (310 of FIG. 5A; 401 of FIG. 6A) forming an outer surface of the connector and having an opening (311 of FIG. 5A) formed in at least a portion of the outer surface and a printed circuit board (320 of FIG. 5A; 420 of FIG. 6A; 500 of FIG. 7A) disposed in the case and including a first layer (321 of FIG. 5A; 421 of FIG. 6A; 510 of FIG. 7A) where a plurality of first pins (5100) (410*a* of FIG. 6A; 5100 of FIG. 7A) are disposed, a second layer (322 of FIG. 5A; 422 of FIG. 6A; 530 of FIG. 7A) where a plurality of second pins (410*b* of FIG. 6B; 530 of FIG. 7A) are disposed, and a ground layer (520 of FIG. 7A) disposed between the first layer and the second layer and disposed to maintain a substantially constant distance from the first layer and the second layer. The plurality of first pins may include at least one first ground pin (411*a* and 422*a* of FIG. 6A; 5101 and 5112 of FIG. 7A). The plurality of second pins may include at least one second ground pin (411*b* and 422*b* of FIG. 6A; 5301 and 5312 of FIG. 7A). The first ground pin and the second ground pin may be formed to be connected through at least one via (540 of FIG. 8).

According to an embodiment, the ground layer may include a mesh ground (560 of FIG. 9) in which at least some ground electrodes constituting the ground layer are disposed in a mesh form.

According to an embodiment, the printed circuit board may be configured to be disposed in a central portion of an inside of the opening formed in the case.

According to an embodiment, the at least one via connecting the first ground pin and the second ground pin may include a plurality of vias disposed at regular intervals.

According to an embodiment, the plurality of first pins may further include at least one first power pin (5104 and 5109 of FIG. 7A), and the plurality of second pins may further include at least one second power pin.

According to an embodiment, the at least one first power pin and the at least one second power pin may be formed to be connected through at least one via.

According to an embodiment, the plurality of first pins and the plurality of second pins may further include at least one super speed transmission (TX) pin capable of fast data transmission.

According to an embodiment, the mesh ground may be formed at a position corresponding to a position where the at least one super speed TX pin is disposed.

According to an embodiment, the ground layer may include a first ground layer (520*a* of FIG. 10A) and a second ground layer (520*b* of FIG. 10A) disposed under the first ground layer. The first ground layer and the second ground layer may be formed to be connected through a plurality of vias disposed at regular intervals.

According to an embodiment, the first layer may include a 1-1th layer (510*a* of FIG. 10B) and a 1-2th layer (510*b* of FIG. 10*b*) disposed under the 1-1th layer. The 1-1th layer and the 1-2th layer may be formed to be connected through a plurality of vias disposed at regular intervals.

According to an embodiment, the printed circuit board may include a plurality of conductive layers including the first layer, the second layer, and the ground layer and an insulating layer (550 of FIG. 8) disposed between the conductive layers. The insulating layer may include a dielectric material having a permittivity of 0.02 or less.

According to an embodiment, the printed circuit board may include a first area (801 of FIG. 12) formed of a rigid printed circuit board, a second area (802 of FIG. 12) extending from the first area and formed of a flexible printed circuit board, and a third area (803 of FIG. 12) extending from the second area and formed of a rigid printed circuit board.

According to an embodiment, the mesh ground may be formed at a position corresponding to the second area.

According to an embodiment, the opening may be formed to be coupled with an external connector in a forward or reverse direction. The plurality of first pins may correspond to the forward direction, and the plurality of second pins may correspond to the reverse direction.

According to an embodiment, the connector may be a universal serial bus (USB) type-C connector.

An electronic device according to an embodiment of the disclosure may comprise a housing (110 of FIG. 2) and a connector (300 of FIG. 5A; 400 of FIG. 6A) disposed in the housing. The connector may include a case (310 of FIG. 5A; 401 of FIG. 6A) forming an outer surface of the connector and having an opening (311 of FIG. 5A) formed in at least a portion of the outer surface and a printed circuit board (320 of FIG. 5A; 420 of FIG. 6A; 500 of FIG. 7A) disposed in the case and including a first layer (321 of FIG. 5A; 421 of FIG. 6A; 510 of FIG. 7A) where a plurality of first pins (5100) (410*a* of FIG. 6A; 5100 of FIG. 7A) are disposed, a second layer (322 of FIG. 5A; 422 of FIG. 6A; 530 of FIG. 7A) where a plurality of second pins (410*b* of FIG. 6B; 530 of FIG. 7A) are disposed, and a ground layer (520 of FIG. 7A) disposed between the first layer and the second layer and disposed to maintain a substantially constant distance from the first layer and the second layer. The plurality of first pins may include at least one first ground pin (411*a* and 422*a* of FIG. 6A; 5101 and 5112 of FIG. 7A). The plurality of second pins may include at least one second ground pin (411*b* and 422*b* of FIG. 6A; 5301 and 5312 of FIG. 7A). The ground layer may include a mesh ground (560 of FIG. 9) in which at least some of ground electrodes constituting the ground layer are disposed in a mesh form.

According to an embodiment, the printed circuit board may include a first area (801 of FIG. 12) formed of a rigid printed circuit board, a second area (802 of FIG. 12) extending from the first area and formed of a flexible printed circuit board, and a third area (803 of FIG. 12) extending from the second area and formed of a rigid printed circuit board.

According to an embodiment, the mesh ground may be formed at a position corresponding to the second area.

According to an embodiment, the plurality of first pins and the plurality of second pins may further include at least one super speed transmission (TX) pin capable of fast data transmission.

According to an embodiment, the mesh ground may be formed at a position corresponding to a position where the at least one super speed TX pin is disposed.

According to an embodiment, a conductor constituting the connector may be formed of copper (Cu).

The invention claimed is:

1. An electronic device comprising:

a housing;

a main printed circuit board disposed in the housing; and a connector disposed in the housing and electrically connected with the main printed circuit board wherein the connector is configured to couple to an external connector, wherein the connector comprises:

a case; and a printed circuit board disposed in the case, exposed via an opening of the case and comprising:

a first layer where a plurality of first pins are disposed;

a second layer where a plurality of second pins are disposed; and a ground layer disposed between the first layer and the second layer and disposed to maintain a substantially constant distance from the first layer and the second layer, wherein: the plurality of first pins comprise two first ground pins respectively disposed at two outermost positions;

two first power pins disposed between the two first ground pins; and, two first super speed transmission pins respectively disposed between one of the two first ground pins and one of the two first power pins near to each other, wherein the plurality of second pins comprise;

two second ground pins respectively disposed at two outermost positions;

two second power pins disposed between the two second ground pins;

two second super speed transmission pins respectively disposed between one of the two second ground pins and one of the two second power pins near to each other, wherein the two first ground pins and the two second ground pins are connected through a plurality of vias arranged along the first ground pin and the second ground pin, and wherein the two first ground pins and the two second ground pins are connected to the ground layer through the plurality of vias.

2. The electronic device of claim 1, wherein the ground layer is a return path for the plurality of first pins and the plurality of second pins and comprises a mesh ground in which at least some ground electrodes of the ground layer are disposed in a mesh form.

3. The electronic device of claim 1, wherein the printed circuit board is disposed in a central portion of an inside of the opening formed in the case.

4. The electronic device of claim 1, wherein the plurality of vias comprises:

a first via connecting a first pair of a first one of the outermost first ground pins, a first one of the outermost second ground pins and the ground layer; and a second via connecting a second pair of a second one of the outermost first ground pins, a second one of the outermost second ground pins and the ground layer.

5. The electronic device of claim 2, wherein:

the first and second super speed transmission (TX) pins are capable of fast data transmission, and the mesh ground is formed at positions corresponding to positions where the first and second super speed transmission (TX) pins are disposed.

6. The electronic device of claim 1, wherein the ground layer comprises:

a first ground layer; and a second ground layer disposed under the first ground layer, and wherein the first ground layer and the second ground layer are configured to be connected through a plurality of vias disposed at regular intervals.

7. The electronic device of claim 1, wherein the first layer comprises:

a 1-1th layer; and a 1-2th layer disposed under the 1-1th layer, and wherein the 1-1th layer and the 1-2th layer are configured to be connected through a plurality of vias disposed at regular intervals.

8. The electronic device of claim 1, wherein:

the printed circuit board comprises:

a plurality of conductive layers comprising the first layer, the second layer, and the ground layer; and an insulating layer disposed between conductive layers of the plurality of conductive layers, and the insulating layer comprises a dielectric material having a permittivity of 0.02 or less.

9. The electronic device of claim 2, wherein the printed circuit board comprises:

a first area formed of a rigid printed circuit board;

a second area extending from the first area and formed of a flexible printed circuit board; and a third area extending from the second area and formed of a rigid printed circuit board, wherein the mesh ground is formed at a position corresponding to the second area.

10. The electronic device of claim 1, wherein:

the opening is formed to be coupled with an external connector in a forward or reverse direction, the plurality of first pins correspond to the forward direction, and the plurality of second pins correspond to the reverse direction.

11. The electronic device of claim 1, wherein the connector is a universal serial bus (USB) type-C connector.

12. An electronic device comprising:

a housing;

a main printed circuit board disposed in the housing; and a connector disposed in the housing and electrically connected with the main printed circuit board, wherein the connector comprises:

a case forming an outer surface of the connector and having an opening formed in at least a portion of the outer surface; and a printed circuit board disposed in the case and comprising:

a first layer where a plurality of first pins are disposed;

a second layer where a plurality of second pins are disposed; and a ground layer disposed between the first layer and the second layer and disposed to maintain a substantially constant distance from the first layer and the second layer, wherein: the plurality of first pins comprise two first ground pins respectively disposed at two outermost positions;

two first power pins disposed between the two first ground pins; and, two first super speed transmission pins respectively disposed between one of the two first ground pins and one of the two first power pins near to each other, wherein the plurality of second pins comprise;

two second ground pins respectively disposed at two outermost positions;

two second power pins disposed between the two second ground pins;

two second super speed transmission pins respectively disposed between one of the two second ground pins and one of the two second power pins near to each other, wherein the ground layer comprises a mesh ground in which at least some ground electrodes of the ground layer are disposed in a mesh form.

13. The electronic device of claim 12, wherein the printed circuit board comprises:

a first area formed of a rigid printed circuit board;

a second area extending from the first area and formed of a flexible printed circuit board; and a third area extending from the second area and formed of a rigid printed circuit board.

14. The electronic device of claim 13, wherein the mesh ground is formed at a position corresponding to the second area.

15. The electronic device of claim 12, wherein:

the first and second super speed transmission (TX) pins are capable of fast data transmission, and the mesh ground is formed at positions corresponding to positions where the first and second super speed transmission (TX) pins are disposed.

16. The electronic device of claim 12, wherein a conductor of the connector is formed of copper (Cu).

17. A printed circuit board (PCB) of an electronic device connector, the PCB comprising:

a first layer with first pins arranged at regular intervals and comprising two first ground pins at outermost positions, two first power pins, first signal pins, and a first super speed transmission (TX) pin;

a second layer with second pins arranged at regular intervals in alignment with the first pins and comprising two second ground pins connected to the two first ground pins through first via, two second power pins connected to the two first power pins through second vias second signal pins and a second super speed TX pin; and a ground layer to maintain distance between the first and second layers and through which the first and second vias extend.

18. The PCB of claim 17, wherein:

the ground layer comprises a mesh ground in which a ground electrode is disposed in a mesh form, and the ground layer comprises:

a first ground layer; and a second ground layer disposed under the first ground layer and connected with the first ground layer through vias disposed at regular intervals.

19. The PCB of claim 17, wherein the first layer comprises:

a 1-1th layer; and a 1-2th layer disposed under the 1-1th layer and connected with the 1-1th layer through vias disposed at regular intervals.

* * * * *